US008161151B2

(12) United States Patent
Schindler et al.

(10) Patent No.: US 8,161,151 B2
(45) Date of Patent: *Apr. 17, 2012

(54) METHOD FOR MODIFYING THE OPERATING MODE OF A TECHNICAL COMMUNICATIONS GROUP PLATFORM (TCGPL) OF A TELECOMMUNICATIONS NETWORK (TC NETWORK)

(75) Inventors: Sigram Schindler, Berlin (DE); Juergen Schulze, Berlin (DE); Doerte Schoenberg, Berlin (DE)

(73) Assignee: Sigram Schindler Beteiligungsgesellschaft mbH, Berlin (DE)

( * ) Notice: Subject to any disclaimer, the term of this patent is extended or adjusted under 35 U.S.C. 154(b) by 0 days.

This patent is subject to a terminal disclaimer.

(21) Appl. No.: 12/978,494

(22) Filed: Dec. 24, 2010

(65) Prior Publication Data

US 2011/0256847 A1 Oct. 20, 2011

Related U.S. Application Data

(63) Continuation of application No. 11/671,023, filed on Feb. 5, 2007, now Pat. No. 7,873,720.

(60) Provisional application No. 60/867,712, filed on Nov. 29, 2006, provisional application No. 60/867,727, filed on Nov. 29, 2006.

(30) Foreign Application Priority Data

| Feb. 3, 2006 | (DE) | 10 2006 005 923 |
|---|---|---|
| Feb. 21, 2006 | (DE) | 10 2006 008 918 |
| Mar. 1, 2006 | (DE) | 10 2006 010 486 |
| Mar. 7, 2006 | (DE) | 10 2006 011 438 |
| May 19, 2006 | (DE) | 10 2006 023 918 |
| Sep. 25, 2006 | (DE) | 10 2006 045 879 |
| Nov. 14, 2006 | (DE) | 10 2006 053 893 |
| Nov. 29, 2006 | (DE) | 10 2006 057 066 |

(51) Int. Cl.
*G06F 15/173* (2006.01)
(52) U.S. Cl. ........ 709/223; 709/200; 717/116; 717/108; 718/100; 706/10; 706/47
(58) Field of Classification Search .................. 709/200, 709/223; 717/108; 706/10, 47
See application file for complete search history.

(56) References Cited

U.S. PATENT DOCUMENTS 5,953,524 A * 9/1999 Meng et al. ............... 717/108
(Continued)

FOREIGN PATENT DOCUMENTS
EP 0454332 A2 10/1991
(Continued)

*Primary Examiner* — John Follansbee
*Assistant Examiner* — Anthony Mejia
(74) *Attorney, Agent, or Firm* — Novak Druce DeLuca + Quigg LLP

(57) ABSTRACT

The invention relates to a method for modifying the operating mode of a technical communications group platform (TCGPL) of a telecommunications network (TC network) for at least one driving object 1 which is controlled by a subscriber object (SUBC), by modifying by means of at least one modifying object 2 the operating mode of at least one object 3 which is to be modified or has been modified, and a telecommunications group platform (TCGPL) for producing technical communications group processes (TCGPs). The invention further relates to a method for managing technical communications group processes (TCGPs) with the steps: provision of a driving object which defines at least one further object to be provided; making available of at least one modifying object for the provision of the further object defined by the driving object; generation of an algorithm from the modifying object; and provision of the further object by execution of the algorithm.

14 Claims, 7 Drawing Sheets

U.S. PATENT DOCUMENTS

Figure 1:
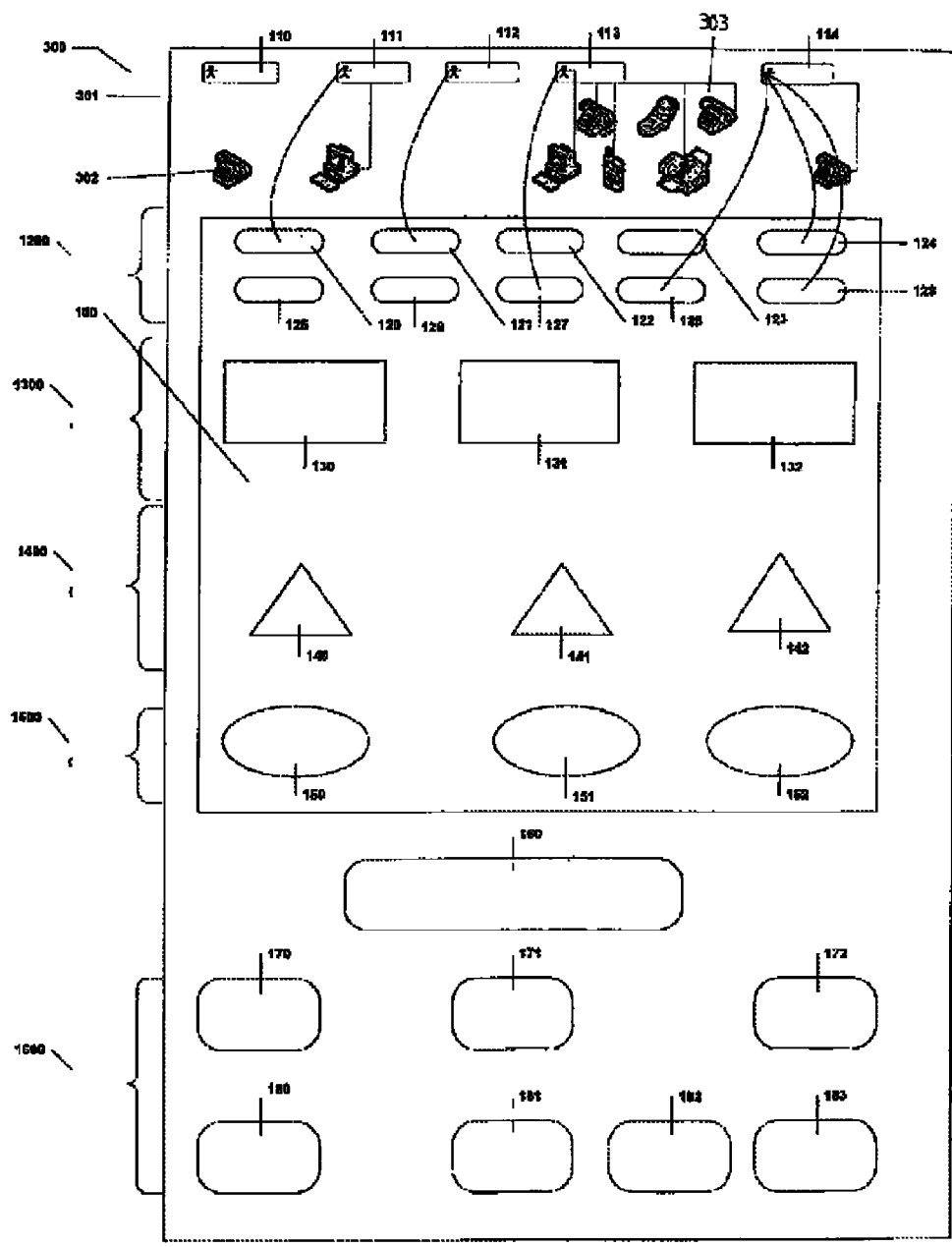

| | | | |
|---|---|---|---|
| 6,135,646 A * | 10/2000 | Kahn et al. | 709/217 |
| 6,144,672 A | 11/2000 | Brauner | |
| 7,203,738 B1 * | 4/2007 | McGill et al. | 709/219 |
| 7,418,426 B1 * | 8/2008 | Reunert et al. | 705/40 |
| 7,546,633 B2 * | 6/2009 | Garg et al. | 726/4 |
| 2002/0066022 A1 * | 5/2002 | Calder et al. | 713/200 |
| 2005/0257197 A1 * | 11/2005 | Herter et al. | 717/116 |
| 2008/0167918 A1 * | 7/2008 | Clayton et al. | 705/7 |
| 2009/0260056 A1 * | 10/2009 | Garg et al. | 726/1 |

FOREIGN PATENT DOCUMENTS

WO 98/46030 A2 10/1998

* cited by examiner

METHOD FOR MODIFYING THE OPERATING MODE OF A TECHNICAL COMMUNICATIONS GROUP PLATFORM (TCGPL) OF A TELECOMMUNICATIONS NETWORK (TC NETWORK)

A. SUBJECT MATTER OF THE INVENTION

The invention relates to a method for "related object"—individually specifiable virtually real-time management particularly of attributable—i.e. describable by attributes—technical communications group processes (ATCGPs) of a technical communications group platform (TCGPL). This management of an ATCGP—also its new establishment or termination—can thus be specified according to the invention by an "attributable subscriber" (ASUBC), as a rule only for it and if it is related to this ATCGP, and indeed by means of an attribute (AATT) identified/specified by it.

This "ATCGP concerned object-individually" specifiable management of this ATCGP is functionally realised by means of at least one—statistically or dynamically furnished by the ATCGPL (=attributable technical communications group platform") for it, possibly concerned object-individually—executable attributable ATCF (="attributable telecommunications function"), which has as a rule been specified by this ASUBC via AATT. This AATT/ATCF can be used in particular for reporting to ASUBCs concerning such an ATCGP. A further peculiarity of this virtually real-time ATCGP management according to the invention consists in that it is based on continuously automatable generations/interactions of all the above-mentioned objects, and this makes its real-time capability possible.

B. BACKGROUND OF THE INVENTION

First indications relating to this future class of TCGPs of greater technical complexity—with simultaneously considerably reduced complexity of use because this will be automated to a great extent—are the following which are offered today:

"E-mail"/"forum"/"blog" services of the IP-switching WWW/Internet and/or

"push to talk"/"push to listen"/"push to know"/ "push to . . . " services of the TC networks of different provenances, whereby the Internet/WWW will hereafter be regarded/described as a telecommunications network.

Furthermore, so-called call handling tables are known, in which a called subscriber lays down which call handling an incoming call for it should undergo.

A related object-individually determined management for example of an individual TCGP of these services does not exist to date. However, it is to be endeavoured for the first time to enable, amongst other things, such individual TCGPs to be managed by objects related to them individually/comprehensively/dynamically/in virtually real-time, in any case as extensively as their TCGPL allows, whereby these related objects can be comprehensively informed according to the invention.

In particular, all conventional TC services with customary telephone calls, which are described below in their entirety as "basic telephone/videophone calls", are to be regarded as belonging to the state of the art. In particular all such calls are basic which are based completely on TC services (in particular regardless of by whom standardised) which have been published (regardless of by whom).

C. SUMMARY OF EXAMPLES OF THE INVENTION

First of all, a purely language-related simplification will be made for the description of the method according to the invention—also for the wording of its claims. The attributability of the ATCGPL objects is omitted in abbreviated identifiers thereof in such a way that these are as a rule described as SUBC, TCGP, ATT/TCF and TCGPL, as has previously already occurred.

It should then firstly be noted:

Not only can the definition of any desired ATTs by/through SUBCs by means of any desired programming language (starting from FORTRAN, ALGOL, PASCAL, COBOL, LISP; APL, . . . via SQL, C and C++, . . . . to JAVA, HTML, XML, . . . ) or its semantically possibly higher and in any case "pragmatically optimised functions" be performed on the user interface, But also the compilation of these ATTs into semantically equivalent executable TCFs by means of a compiler/interpreter of such a programming language or their integration into the TCGPL—by means of a linker/loader and interfaces for them provided by the participating TC networks—can be performed automatically, at some point in time between ATT definition time and TCF execution time, whereby all these "software technicalities" are used by the method according to the invention in any desired way in a TCGPL. The ATTs defined/extended/modified by a SUBC can be fed "instantly" and in an "as far as possible automated" way for automatic compilation/integration/use in a TCGP management equivalent for them.

An exemplary embodiment of the invention relates to a method for managing technical communications group processes (TCGP) with the steps:

a) Provision of a driving object which defines at least one further object to be provided;
b) Making available of at least one modifying object for the provision of the further object defined by the driving object;
c) Generation of an algorithm from the modifying object;
d) Provision of the further object through execution of the algorithm.

Special embodiments of the invention are clarified in the following description. This meaning-related content of the present application facilitates the implementation of its method and thus the functionality of a TCGPL on at least one server within or/and outside of a TC network.

The present invention comprises TCGPs and their TCFs based on more than two SUBCs and also services provided to further ASUBCs (i.e. to SUBCs outside of this TCGP or this ATCGPL.) which are provided by ATCFs.

The present invention additionally comprises the user-controlled definition of new (thus dynamic) functionalities.

The present invention discloses multiple management functionalities for/of

Real-time interactions in real-time audio/video communications processes in such important TCGPs as telephone calls/conferences, Messages from user groups, Message fragments or message conglomerates The following outlines of the TCGP management of a TCGPL are also valid—in a clearly meaning-adapted way—for the management of any other object type of a TCGPL, therefore object type-specific repetitions can be omitted.

C.1. Basic Elements of Such a TCGPL

Objects of a TCGPL are its SUBCs, TCGPs, ATTs, TCFs. These objects of the TCGPL can access external information sources as desired. The term "subscriber (SUBC)" means in the sense of the present invention a SUBC line for example to a TC network or another communications mechanism, one or more of end devices or end systems which are connected to a SUBC line, a human SUBC who uses end devices or end systems connected to a SUBC line as well as a "communications application system" which is computer-supported or otherwise supported used by such a human SUBC. Since, in the case of the present invention, it is not a question of distinguishing between an end device which sends or accepts a call for example (or more generally is related to a TCG and/or a TCF in some way), the SUBC line to which the end device is connected, the human SUBC who triggers such a sending/acceptance (or relatedness) and the application systems involved in this TCGP, such a distinction will not be made either—the term "SUBC" is accordingly to be understood in general terms.

The term "technical communications group process (TCGP)" stands, in the present invention, for such an entirety of (computers and supported by them) actual and/or potential, effected particularly via the execution of TCFs, discrete and/or continuous interactions between two or more SUBCs and/or their communications applications that this means an "information transmission" between them, irrespectively of whether successful or not, whether already having taken place or still potential.

A SUBC (possibly also any other object of the TCGPL) may be related at a point in time by one or more TCGPS (possibly also to any other object of the TCGPL)—whereby the intuitively understood term "related to" is equivalent to "is connectable".

The method according to the invention can enable each SUBC related to a TCGP to request from the TCGPL a comprehensive report system concerning this TCGP, e.g. not only concerning which TCFs have actually been or are to be performed for it but possibly also whether and which further—also "illegal"—measures (insofar as identifiable) are/have been requested by this TCGP and/or are/have been performed, possibly working with alarms of various characterisation.

C.2. Improvement of the TCGP Management of a TCGPL in Relation to the TCGP Indicators Proving themselves to be even more significant than the first indicators of future special TCGP services on the various TC networks addressed in the introduction to Section B—particularly from company/economic/business/professional viewpoints—should be the future and much more intelligent TCGPLs which, within the scope of their possibilities, allow the definition/creation/further development of a multitude of different TCGPs. In the company/economic/business/professional field they should have a significance which complements that of the computer-supported organisation systems to date (as known from the fields for example of the systems for Enterprise Resource Planning/ERP, Customer Service Management/CSM, Advanced Call Forwarding/ACF, Interactive Voice Response/IVR). The present invention is geared in particular to the complementing of these afore-mentioned "conventional" TCGP forerunner systems in multiple respects. The management thereby provided according to the invention of complemented TCGPs is not in any way limited to real-time measures—i.e. it is not limited to "on-line translations/commentaries of telephone conversations—but instead can also include processes/objects lying/existing before the real-time of a TCGP and/or thereafter.

A method is therefore provided according to the invention which allows a functional system (within the scope of an identifiable or a non-identifiable TCGPL or a mixed form thereof) to be determined, which consists of a plurality of apparently independently acting TCFs for TCGPs and/or those calling on each other, whereby the former can be constantly functionally defined/identified/modified by SUBCs related to the latter. The invention comprises a plurality of variants of such functional systems.

C.3. Some Properties of the TCGP Management Disclosed Here

The management of a TCGP of a TCGPL according to this application comprises as a rule:

Not only the defining, generation, registration, billing and documentation of ATTs/TCFs at any moment for this TCGP, But also the execution of all TCFs according to the ATTs forming the basis thereof.

A few clarifications in this respect.

The individuality of the specifiability of the management of each TCGP means that for example those entitled may be specified by its originator, whereby he can, however, form this specification in such a way that possibly any further object related to this TCG/P can complement this specification in relation to e.g. identities and/or meanings etc., of this TCGP.

The relatedness of an object of the TCGPL through a TCGP implies that someone related to it has determined/defined an ATT between this TCGP and this object—if he was authorised for this specification—whereby this object, via an ATT, in a specified selective way, may or may not over-write a further TCGPL object.

The real-time capability of the management of a TCGP means that any modification—regardless of by whom undertaken—of the objects related to this TCGP is incorporated in "virtual real-time", i.e. immediately and automatically, by the TCGPL into it in order to thus guarantee the coming into effect of this modification as far as possible immediately.

The fact that the "supervisor"/"operator" of a TCGPL may have more extensive access to all objects in this TCGPL—as may be regulated by law—is not under discussion here. It should, however, be noted that the functionality of the invention described below may be provided for a TCGPL possibly completely inside of a TC network, possibly for a plurality of TCGPLs at the same time repeatedly with the same and/or different management functionality—whereby this neither excludes that this respective functionality is provided possibly in association with the SUBCs of a TC network or their end systems—(in the sense of the OSI reference model), nor does it exclude that these individual functionalities are provided completely outside of a TC network (e.g. only by its users and/or their end systems and/or their or the TC network servers).

The method according to the invention is not therefore limited to providing one of its TCFs by means of its implementation on at least one server of at least one TCGPL. It can also achieve the operating mode according to the invention without supplying a TCGPL as an independently identifiable entity on one or more servers of one or more TC networks.

C.4. Further Properties of the TCGPL

It is important to note here that the invention does not include the coming into being of the ATTs and the TCFs, but indeed this coming into being as such: Both may for example.

Be specified as parts of the TCGPL from the start and/or be known to all or certain of its SUBCs, and/or Be provided by a SUBC in the course of the use of the TCGPL "by hand" as an ATT and/or TCF and integrated into the TCGPL, or Be produced by means of an "automatic" translator (e.g. compiler/linker/ . . . ) from the ATTs and/or TCFs already known to the TCGPL which are available for this purpose, generated and integrated into the TCGPL.

In the two variants which facilitate "dynamic" TCF provision, the TCGPL must make suitable "interfaces" available and be in a position to integrate the monitoring TCFs of any origin in a virtually real-time way.

C.5. External Relationships of a TCGPL/TCGP

According to the invention ATTs/TCFs can use information from outside of the TCGPL in any desired way, for example from other databases (such as Google currently) or from spontaneous and possibly only temporary information sources, or similar.

C.6. Innovations Embodied by a TCGPL

To conclude this section—which only describes technical properties of the invention so far—it is again emphasised that the method according to the invention allows the SUBC-controlled automated establishment/modification of TCGPs and their TCFs. These automated measures depend upon the respective state of the art in relation to the aim of the virtually real-time implementation of the formulation/compilation/integration of ATTs/TCFs for/in a TCGPL.

Programming languages and compilers/interpreters/linkers/debuggers—such as the state of the art in relation to database concepts—which are both used in any implementation of a TCGPL and its objects—are known to the competent person skilled in the art of software engineering. On the other hand it is known to the competent person skilled in the art of telecommunications technology that there is a network management system for each TC network which allows management of the deployment/use of resources and cost calculation for the conventional connections realised therewith or TCFs of any type.

On the basis of this known state of the art, both in software engineering and in conventional tele-communications, an innovation of the method according to the invention consists in using these two technologies in a highly integrated way—which is completely new—

For/on at least one TC network
    Being able to implement and update at any time
    A TCGPL (or a plurality of possibly quite different TCGPLs)
whereby each TCGPL can contain a plurality of TCGPs
    of new complexity (e.g. group TCGPs)
    And new properties (TCGPS which can be "developed to a great extent")
    And also of both new types whereby these are defined by the respective "content structures" of the ATTs
and can thereby
    Manage each of its TCGPs in the sense of the SUBCs related to it and report to them about it—as these SUBCs have specified by means of the attributes of this TCGP—whereby
        Each such related SUBC can modify its individual management/reporting wishes in relation to this TCGP at any time (by modifying its ATTs/TCFs)
        Such a modification (by a SUBC) can be realised in virtual real-time by the TCGPL and then practised by it.

The method according to the invention always begins with a "base TCGPL"—possibly already with initial objects of any type—whereby the number thereof during the operation of the TCGPL, generally in a SUBC-controlled way,
    Initially grows and may then fluctuate and
    Goes hand in hand with a growth/fluctuation in the number of ATTs/TCFs thereof and these expansions of the TCGPL may also include expansions of its possible numbers of object-supporting symbols, values, programs etc. and their assignments to each other.

D. MORE DETAILED DESCRIPTION OF THE INVENTION AND EXAMPLE ATTS

The method according to the invention requires for example that a SUBC determines the following, amongst other things, for a TCGP,
    under which conditions it can be connected thereto (alias: be related to it)—the SUBC is thus connected to this TCGP—and
    what—in case of "connection" to this TCGP—this SUBC requires for a modification for example in the execution of the TCFs of the TCGP.

This Section D clarifies some fundamental aspects which are to be considered in these determinations. Since these aspects may be quite different from TCGPL to TCGPL and in each TCGPL in its various applications, this clarification cannot in any way represent an exhaustive field of protection of the method according to the invention—but only refers to a few of its facets.

There are method steps of various types which are implicitly required and explicitly determined in the method according to the invention. Those which are explicitly determined are for definition/modification of the objects of the TCGPL to be executed or just executed, those which are implicitly required are for the concurrent continuation of the objects of the TCGPL not covered by this definition/modification. They all take place sequentially for each TCGP and for each SUBC related to it and as a rule at multiple points during the lifetime of a TCGP. Each measure which corresponds to such a method step is thereby performed from the viewpoint of the at least one SUBC in such a way that during its execution for this least one TCGP and/or at least one SUBC all its ATTs remain unimpaired by other step-wise executions of concurrent measures of other SUBCs.

This note should make it clear that—although the execution of these TCGPL objects for/in at least one TCGP as a whole is clearly not a sequential process but instead consists as a rule and amongst other things of a multitude of temporally overlapping (=concurrent) "point-to-point data transmissions and the associated data manipulations",
    both for its original "communications process" of its possibly several/many SUBCs,
    and also for its already effective "management process" both for these SUBCs and others related to this TCGP, but not SUBCs directly participating in its "original communications process",
    and also for the modification measures of these TCGPL objects—for each of these SUBCs the execution of its "definition/modification measure" according to claims is a deterministic unitary process. It is thus not excluded that for example thus defined/modified ATTs/TCFs of this TCGP possibly are modified shortly afterwards by a further SUBC related to it differently from by the first SUBC in its "modification measure" just executed for it. The former SUBC must, during the determination of its "modification measure" for this TCGP, try from the start to appropriately consider or incorporate this—whereby a suitably designed TCGPL can considerably support it.

It should also be noted that, all in all, the TCGP discussed in the previous paragraph, alone with its "original" communication functions themselves—on account of the multitude and possible fundamental differentiation of these "original" functions which can be executed concurrently for it—does not need to be a sequential process as a whole, and hence the data transmissions caused by it do not need to be either. The determination by a SUBC of its "modification measures", mentioned in the previous paragraph, for a TCGP related to it can address its concurrent functions and gear itself to them or not—which can in the latter case cause the undetermined nature of the effects of this definition of "modification measures" for this TCGP in relation to its concurrent functions.

It should not be concluded from the division of a claim wording into features, moreover, that in the definition/modification of a TCGP by a SUBC the abstract method steps therein in a TCGPL accordingly have to appear as concrete individual steps at some point.

Reference is made below to four exemplary types of determinations for each object of the TCGPL via attribution which are in part indispensable for an object (see below), whereby the TCGPL maintains the assignment of these determinations to the respective objects during the period of observetion thereof independently. A plurality of concrete characterisations can in turn exist for each of these four ATT types, even in any single concrete characterisation of a TCGPL—of which, once again, there can be several quite different ones. According to their nature, however, each TCGPL according to claims must realise these four types of determinations in one way or another from the start itself or enable the SUBCs to define them dynamically via ATTs and have them compiled by the TCGPL into TCFs and integrated into the TCGPL.

Before these four exemplary ATT types are explained below, the following very simple structure is determined for them for example—in order to show how flexible the present invention is to use. As already explained in Section C of this document, an ATT is a logical expression in a programming language specified for its definition by the TCGPL, of which the individual terms are either terms of this programming language or "basic ATTs" whereby the latter have the form of "ATT name=xxx". A TCGPL constantly knows a number of "ATT names" and, for each of them, a number of values "xxx", for which these basic ATTS are evaluated as "true". Both sets of numbers can be partially SUBC-defined and are, incidentally, specified by the TCGPL.

(1) Self-attribution of a TCGP by a SUBC authorised for the purpose of its self-description for other objects of the TCGPL and only valid under the conditions determined in these self-ATTs. A self-ATT (alias identification ATT, alias object identification ATT) of the TCGP can—if its originator or initiator allows this—also be further developed by further objects related to this TCGP. A self-ATT of a TCGP enabling such an object (such as a SUBC object) in this respect can be attached to this e.g. (in order to name only three variants) by:
1. the TCGPL for all its objects or
2. a special SUBC authorised for this TCGP by the TCGPL (for example the initiator of this TCGP) or
3. as in 2, whereby, however, this specially authorised SUBC potentially enables all related objects of this TCGP in its self-ATT,
whereby in all three example cases it can also possibly be determined by the attributing object when and/or under what further conditions this further development of this self-attribute of the first TCGP should be valid for which object.
(2) Relationship attribution of a TCGP by a SUBC authorised for this (as in (1)) for the purpose of its connection description with at least one other object and only valid under circumstances determined—in this relationship attribution. This TCGP relationship ATT can—if its originator or initiator or . . . does not rule this out—as in (1), also be further developed by further objects related to this TCGP.

It should be noted that these two types of ATTS (of a TCGP) themselves do not have any implication at all in relation to its operative (alias data manipulation/transmission) and/or reporting measures which (3) and (4) explain below. They are in fact limited to the "connectable/connected" descriptions of the objects of the TCGPL, possibly also in relation to such aspects which SUBCs may and/or should know under which circumstances about this TCGP or which competences this TCGP has or requires in relation to ATTs/TCFs of this TCGP. I.e. even if self-/relationship ATTs/TCFs involve operative ATTs/TCFs, they are limited to the use of their descriptive aspects for the self-description and "connectable/connected" description—but not for the description of the definition/modification of the data manipulations/transmissions of this TCGP in future/currently practised by the TCGPL.

The description of the conditions and effects of the evaluation or execution of at least one ATT/TCF for a TCGP or for an object affected by it is outlined below, likewise the question of the relationship between ATTs and TCFs thereby arising.
(3) Operation attribution of a TCGP by a SUBC authorised for this (as in (1) and/or (2)) for the purpose of the definition/modification of at least one TCF for the or of the TCGP and for this SUBC by means of its execution, whereby this ATT/TCF is only valid under conditions determined—as part of this operation ATT. This operation ATT of the TCGP for a SUBC can—if its ATTs do not exclude this through their originators or initiators or . . . —as in (1) and/or (2) also be developed further by further objects related to this TCGP.
(4) Documentation & Report attribution of a TCP by a SUBC authorised for this (as in (3)) for the purpose of modification of the documentation & reporting of all activities relating to the ATT definition/modification and data transmission/manipulation methods of the TCGP, for example for this SUBC by means of at least one ATT/TCF, whereby this is only valid under conditions which are determined—as part of this task-specific attribution. These documentation & reporting ATTS of the TCGP for a SUBC can—if for example their relationship attributions do not exclude it through their originators or initiators—as in (3) also be further developed by further objects related to this TCGP.

With regard to these "operative ATTs" in (3) and (4) it should firstly be pointed out that the—at least one—TCF/s automatically generated for them by the TCGPL and integrated therein
  Can generate at least one new TCGP for an object of the TCGPL—if the ATT/s forming the basis thereof provide/s for this—but which as a rule is associated with the data transmission of this object, as described in the following sub-point,
  And can also manipulate the data transmission of this object and/or of this further TCGP (of the above sub-point) in any respect, namely in such a way as provided for by the ATT/s forming the basis thereof.

It is also once again pointed out here that there are highly developed programming languages—and for them, compilers/interpreters/linkers, etc,—which allow ATTs of any level of complexity to be written and their TCFs to be integrated into a TCGPL. The development of such ATTs for a TCGPL can be routine work on the basis of the state of the art of TC and software engineering. This is known to the competent person skilled in the art, for example being set out in U.S. Pat.

No. 7,069,259 B2. However, the preceding clarification of the existence of these four types of ATTs with a fundamentally different content for a concrete TCGPL or one of its concrete TCGPs does not need to mean anything in relation to its overall presentation on the user interface, thus not all four ATT types need to exist explicitly, Nor do the ATTs/TCFs thereof need to represent only one of these four functionalities—each ATT/TCF can "mix" all four functions with each other.

It already follows from the (almost) synonymous use of the terms ATT and TCF that they stand for the same for the method according to the invention. Both Must, on the one hand, in order to become effective in the method according to the invention, be compilable by the TCGPL into executable code of its computer system (if this has not already taken place) and be integratable into its already existing executable code, and Represent, on the other hand, their identical functionality on different abstraction levels, ATTs on an abstraction level which is somehow defined on the user interface of a TCGPL but as a rule non-procedural, thus descriptive/declarative, and TCFs on an abstraction level which is somehow defined in an TCGPL implementation-internal way but is procedural, thus executive.

The following descriptions of the method according to the invention frequently do not differ, for reasons of simplicity, between the representations of the ATTs/TCFS on the different abstraction levels, for example that of the user interface of a concrete TCGPL and those in their implementation—in such a way that, below, reference is mostly only made to the ATTs (because these are indeed inherent in the TCFs implementing them). This does not mean that the method according to the invention does not allow any TCFs for a TCGPL—regardless of by whom they are provided/defined/generated/integrated—for which there is no ATT at all (e.g. because the programming of a TCF is simpler than the writing of an ATT equivalent thereto, or because on the abstraction level of the ATTs the function to be realised by the TCF is not describable at all).

These quite fundamental explanations in regard to the "TCF definition/modification method" of a TCGPL according to the invention are complemented by a short explanation of the classification of the method according to the invention in regard to the OSI reference model. It can be assignable to each of the 7 layers of the OSI reference model—and this is dependent upon the functionality of its ATT/s under observation—, possibly to more than one of them simultaneously, but always their management area. An important conclusion from this recognition is that it is not limited to the data transmission methods of the TCGPL of "payload" or similar in a TCGP, but the claim wording/meaning content of this application quite clearly considers all data transmissions of the TCGPL.

These fundamental explanations for the TCGPL "operating mode" will be elaborated somewhat.

Firstly it is noted that the operating mode of a TCGPL allows, for a considered SUBC, in relation to a considered TCGP, Not only manifest (in the sense of "constantly recognisable by any of the related objects of the TCGP") object-specific management measures to be determined, But also such (partially) transparent (in the sense of "only recognisable by preferred related objects and/or only at times") management measures.

A SUBC can thus make determinations, for example for a TCGP in relation to its identity in such a way that its anonymity is temporally or permanently granted and/or in relation to certain or all objects.

In relation to these ATTs it is again stressed that all descriptions of any of its organisation or its assignment to objects of a TCGPL have merely exemplary character in this document. The features of the claims are free of any limitation in relation to the attributes/attribution—except for their restrictions explicitly formulated therein.

The execution of the method according to the invention in a TCGPL consists in principle of four types of functional—i.e. implementation-independent—measures relating to its actual objects:

Firstly, of the method-inherent (so-called "independent") updating and evaluation of all ATTs of the TCGPL (which have been determined by the method according to the invention—in its initial functional specification or its later modification—, if need be at times according to these specifications/modifications).

Secondly, of the possible release or non-prevention of each execution of a TCF required by an object, if this release or non-prevention proves to be specified by an ATT, Thirdly, in preventing the execution requested (regardless of by whom) of a TCF defined or not defined in the TCGPL at a point in time for/on an object and/or one of its data transmission methods which was not specified by the method according to the invention—in the initial functional specification or its later modification—as admissible for this at this point in time, And fourthly, in logging/documenting/reporting for/to a SUBC, possibly in all three aforementioned cases concerning all involved objects, as well as further meaningful references to their possibly identity/intentions/interested parties/commissioner, etc.

An exemplary attribution of an application of the method according to the invention is outlined in the following paragraphs—whereby these outlines are only fragmentary.

In this exemplary attribution, each object obtains upon its initiation in the TCGPL and retains during its existence therein and possibly beyond that the two ATTs clearly identifying it under all circumstances, named "Obj-Id" and "Obj-Typ-Id". They can be used in self-explanatory logical expressions for example of the form "Obj-Id =+49 30 399 28 xx" or "ObjTyp-Id=XXX" (whereby the latter as a rule can only evaluate for one of the XXX values SUBC, TCGP or ATT/TCF as "yes", the former for all values of xx, such as 00 or 27, complementing the present central telephone number of TELES).

In this attribution example each object can, during its existence in the TCGPL, as a rule be dynamically provided with further ATTs—in addition to its two a priori Obj-/Typ-Id-ATTs—or be freed of them. An ATT is thereby, as outlined above:

Either "self-specific", i.e. it describes a feature of its carrier object, whereby the two striking and unmodifiable object features are the "Obj-Id"-ATT and the "ObjTyp-Id"-ATT. In general the logical expression of such a "self-attribute" can, however, contain, besides these two features of its carrier object, also features and/or ATTs of other objects and the TCGPL and change in time. However, the logical expression of a self-attribute applies in any case only in relation to the referencing capability of its carrier object in other logical expressions, particularly in "relationship attributes" of other objects. If, for an object, the validation of a self-attribute in a logical formula is not possible at a point in time, this logical formula is invalid in its entirety at this point in time.

Or "relationship-specific", i.e. it describes the connectability/connection of its carrier object and its ATTs at a point in time with another object and its ATTs at this point in time—possibly with the aid of further ATTs of the TCGPL—and is correspondingly called a "relationship attribute". Instead of "be connectable", "related" is frequently used.

A relationship ATT of an object is—in the example considered here—a logical expression of ATTs which contains at least one self-ATT of at least one other object. This other object is always connectable to the first object by dint of this relationship ATT and is connected at a point in time if this self-ATT has the value "true" at this point in time.

Which objects in a TCGPL (at a point in time T1) are related to which other objects (=which objects can be connected to each other) or are currently connected to each other can be simply illustrated in the space defined by a 3-dimensional cartesian coordinate system. Its axes may be called X, Y and Z, and only "grid points" with whole number coordinate triples (Xi,Yj,Zk) are considered therein.

Since the set of the objects of this TCGPL is countable, we can arrange them in any sequence and place this sequence both on the points X1/X2/ . . . and also Y1/Y2/ . . . of the X- and Y axes. If an object Xi relates to an object Yj—can be connected to it—the grid point (Xi,Yj,0) is to be marked with a "yes".

In order to be able to systematically decide which relationship ATTs effect this, the finitely great number of relationship ATTs of the TCGPL are brought into a sequence and this is placed on the points Z1/Z2/ . . . of the Z axis, whereby the relationship ATTs of an Xi in relation to a Yj can be arranged on the Z axis in any sequence but consecutively.

For each object Xi, there is, then, in relation to Yj, a "lowest" Zk, which corresponds to a relationship ATT of object Xi in relation to Yj (independently of the observation of the validity of the self-ATTs of Xi and Yj).

For the evaluation of the relationship ATT Zk at the point in time T1 in relation to the objects Xi and Yj, it is to be clarified by their self-ATTs in Zk whether the former can be reduced with the aid of the latter to "true". In this case the grid point (Xi,Yj,Zk) is to be marked with "yes", otherwise—if object Xi has another relationship ATT lying higher on Z in relation to Yj—the next highest of such relationship ATTs Zm is to be selected, and (furthermore, at point in time T1) its possibility of the "true" reduction in Zm by means of the self-ATTs of Xi and Yj is to be found out, and so on. It should be noted that the "true" reduction of Zk or Zm can also fail for other reasons, for example because other constituent parts of these two logical expressions (at point in time T1) are not defined.

Four comments—concerning ATTs and the "related/connectable" relationship definable with the aid thereof between the TCGPL objects—illustrate a possible operating mode of an ATT-based addressing/association mechanism of a TCGPL:

ATTs may be "redundant" (for example a relationship ATT of Xi can "match" with a plurality of self-ATTs of Yj and with a plurality of self-ATTs Xk, of which the relationship ATTs for their part match with Yj)—Xi then relates to Yj in a multiple redundant way—but do not need to be "symmetrical" in any way (it does not need to follow from "Xi relates to Yj" that "Yj relates to Xi", but it can).

Self-ATTs of an object can reflect its (possibly temporary) "internal condition/state" in relation to its openness with regard to external association attempts—they do not, however, practise this openness actively but instead completely passively in that they allow involvement, or not, in relationship attributes.

Relationship ATTs of an object can reflect its active "partner search situation", its self-ATTs its passive "partner acceptance structure".

Besides the object-bound ATTs, a TCGPL can contain independent, so to speak "free floating", ATT/TCF objects, which—in order to make them dynamically effective therein—must be assigned by "driving" objects (see claim 1) in their identifications/definitions firstly to "carrier" objects.

This addressing/association mechanism of the objects of a TCGPL between themselves according to the invention allows it to ensure that their TCGPs behave or are managed "in accordance with regulations", i.e. how these regulations determined by the "driving" objects (see claim wording) are realised by means of the method according to the invention in the modification of the initial TCGP.

This afore-mentioned principle of the present invention will be made more concrete below by way of example in order to facilitate a better overview of this principle—thus only in a fragmented way. Most realistic applications of the method according to the invention may turn out to be technically, thus not on the user interface, much more complicated than indicated below but it is in any case conceived for substantially more complex TCGPLs. It should merely be clarified here which contents the self-ATTs and the relationship ATTs of the example objects SUBC, TCGP, ATT and TCF of a TCGPL can have—whereby alone the terms "self-attributes" and "relationship attributes" only comprise exemplary aids for realising the method according to the invention (as already clarified at several points of this document).

A self-ATT of a SUBC can for example be its "SUBC-id", or its calling number in a TC network, or its account number at a bank, or its initiation time in the TCGPL or its address in a town or its age, education or its body temperature in the morning, its professional position etc. but also the relationship of this SUBC to precisely these actual features of the self-ATTs of other objects but also the relationship of this SUBC to relationship ATTs of any other SUBCs.

A self-ATT of a TCGP is for example its "TCGP-id" or an operating means model of the operating means necessary for its realisation with desired quality of the TCGP or a cost distribution model practised by it of the costs caused by it when these operating means are used, or its limited efficiency or its unwillingness to support certain topical discussions or its real-time translator requirement in case of participation of certain foreigners etc. but also its relationships to relationship ATTs of all types and other objects.

A self-ATT of a TCF describes for example the input/output interfaces on the respective quality levels it has command of but also its relationships to relationship ATTs and/or self-ATTs of all types of other objects.

A self-ATT of an ATT is for example an ATT-id, a name, a value range or its inheritability.

A relationship ATT of a SUBC constitutes for example a relationship of this SUBC to one/a plurality of TCGP/s, for example its/their originator/s and/or actual or potential related objects and/or differentiated cost objects and/or premium recipients and/or those responsible for marketing/law/warranties, etc., TCF/s, for example its/their data manipulation/transmission functionalities and/or originators and or actual or potential related objects, etc., SUBC/s, for example its/their/interests, competences, age, etc., ATT/s, for example its/their value range, modifiability, time of the last modification, etc.

A relationship ATT of a TCGP represents for example a relationship of the TCGP to one/several TCGP/s, for example its/their originators and/or actual or potential related objects and/or differentiated cost objects and/or premium recipients and/or those responsible for marketing/law/warranties, etc.

A relationship ATT of a TCF represents for example a relationship of this TCF to one/a plurality of SUBC/s, for example its/their capability for using the service of the TCF without further aids.

Once again: This possibly actually noteworthy implementation complexity of the ATTs/TCFs of the objects of a TCGPL and I or an application located thereon will appear quite differently on its user interface as a rule—namely as an obvious and completely trivial "characterisation" of these objects, as they are known from word processing systems or presentation languages/systems.

The assignment of ATTs to considered objects of an application on a TCGPL, i.e. the "attribution" of the TCGPL objects of the latter, can—as well as the modification of this assignment and I or the modification of the ATTs, thus the execution of the method according to the invention for modifying the operating mode of the TCGPL, at the initiation of one of its "driving" objects (which is itself a SUBC of the TCGPL or is controlled by such a SUBC in the sense that it has been instanced by a SUBC and has not since been modified and has inherited this "driving" authority in relation to the modification of the TCGPL from this SUBC in such a way that this SUBC is thus responsible for an execution of the method according to the invention by means of this "driving" object)—can take place flexibly as desired, for example At the identification/definition times outlined below:
At the definition/development time of this application,
At its instancing or incarnation time,
During its execution at the times provided for this, possibly
Already at the time of the definition of the TCGPL on which it is located—i.e. a TCGPL can allow the anytime execution of the method according to the invention for an application located on it, for all or for specific objects of the TCGPL or this application, and In relation to the times of coming into effect of this modification measure. Namely
Immediately, at the beginning or end through the TCGPL of the modification measure,
Later, thus after the modification measure, e.g. at the beginning or end through the TCGPL of the checking or the execution or the coming into effect of an ATT of a considered and not yet existing object—possibly an ATT,
Even later, namely as with the above enumeration point but only with existing objects.

A TCGPL can thus delay the temporal/partial coming into effect of the execution of the method according to the invention (e.g. its immediate modification, visible to the SUBC, of the TCGPL operating mode or modification of the TGCPL operating mode only with further triggering of the SUBC controlling the "driving" object)—at the triggering of the object "driving" this execution—and make it dependent upon the "true" evaluation of at least one further ATT.

On the user interface a reference to the "true" evaluation of this ATT of a TCGPL can evoke the impression that the object "driving" one of its modifications is not a SUBC (or is not controlled by a SUBC). For the determination of the field of protection of the present document, this impression is irrelevant—it is merely relevant with such a modification of the TCGPL that it can take place and takes place in the end only in a SUBC-controlled way and only by a "modifying" object (somehow supplied in the TCGPL previously) in an automated way.

Finally, an ATT can be provided at a time with a real number or an interval in the real numbers, its so-called "evaluation". Such an evaluation of an ATT likewise only needs to exist temporarily and can vary in time. This ATT evaluation can serve for the prioritisation of the different ATTs of an object or be used by/in the TCGPL in a different way.

E. OUTLINES OF SOME APPLICATION CATEGORIES OF THE INVENTION

It is clarified in this section by means of 8 application categories of the method according to the invention that this application in principle comprises completely new—highly attractive in social/economic terms—forms of the use of modern communications technology.

With these TCGPL outlines, not only the enormous potential of the method according to the invention is clarified but instead they also show that the present invention has nothing in common with the state of the art to date insofar as it discloses and technically develops very much more general fields of use of telecommunications technology than are known to date for telecommunications technology.

E.I. No Limitation of the TCGP Services to Initial/Terminal SUBCs:

According to the invention a TCGP may or must, at the time of its initialisation or thereafter
Not yet have an ATT which identifies the SUBC/s related to it finally, or
Potentially relate to so many SUBCs that it makes no sense to let all of them know anything at all of their relatedness at these points in time.
An example is a TCGP which describes itself as a telephone call/conference and can be connected, on account of this ATT, with a multitude of other SUBCs, whereby the initiator of this TCGP expects the contact establishment with it or this TCGP by interested SUBCs—which thereby become connected SUBCs.
A certain "SUBC profile" can be specified for such a TCGP, e.g. by a SUBC related to it, by ATT, in such a way that
A further related SUBC which satisfies this SUBC profile is actively invited by the TCGPL into this TCGP, or
A connected SUBC of the TCGP which satisfies this profile can take over some moderation activities in this TCGP.
In the same way the SUBC which initiates this TCGP can characterise it in such a way that it only allows one "caller" and finally terminates at only one SUBC (at the "called party")—both clearly meaningful in "two party TCGPs", definable by suitable ATTs for this TCGP—whereby, however, they do not both need to exist at the time of initialisation of this TCGP.
Such a TCGP can, on account of its performance capability, also be meaningful without these two special SUBCs and be offered on the TCGPL—whereby e.g. one of two SUBCs using it has to pay a certain fee to the initiator. A TCGP can, however, also be arranged according to the invention in such a way that it identifies certain SUBCs as related to it from the start—even if these SUBCs do not a priori know anything about this TCGP, or possibly they do not even yet exist.

EII. Flexible Caller, Called Party, Related Object and TCGP Identification:

Far-reaching identification measures can be triggered by the TCGPL by a further object of this TCGPL related to a first object of this TCGPL. These may be definable by at least one of the two dynamically, e.g. initiator and/or SUBC identifications of all TCGPs related to one of the two objects, in the simplest case all related telephone calls. This identification can mean the detection of the network connection number of the calling party by means of an evaluation of signalling information, in other cases the times and the location and/or of another "attribute pattern" of the TCGP in question.

In particular the different forms of the step-wise auto-identification of the actually involved objects and/or their attributes can belong to the method according to the invention, with or without or with the exclusion of the cooperation (in this step-wise auto-identification) of the only potentially related objects.

A few examples should illustrate this in preferred embodiments.

A telephone caller identification (identification of the temporally first of the SUBCs related to such a TCGP) carried out for the called party in this TCGP (e.g. the temporally second of the SUBCs related to this TCGP) or for another related object of this TCGP, requires from the TCGPL merely to perform the TCF "automatic caller number identification".

A caller identification can, however, take place in a less trivial way and include in particular further identification means provided by the calling SUBC (for example in the form of "call user data" or a DTMF sequence) and evaluated by the called SUBC. Semantically, the caller identification for a telephone call preferably includes:

The checking whether a personalised emergency code exists which thus identifies the person of the calling SUBC and possibly also signals its emergency, and/or The checking of a relevant access code which enables the called SUBC to provide the suitable context for the call from the start, and/or The advice of the calling SUBC of its readiness, after corresponding request by potentially called SUBCs, to advise differentiated self and/or task identification data, as is e.g. generally known from IVR systems (IVR=interactive voice response).

In a method according to the invention, it is possible in particular for such a caller/task identification to be specified by at least one SUBC dynamically for at least one TCGP which allows this SUBC as potentially called by it—whereby the latter SUBC can perform a self-attribution of its own of this TCF (also by means of a further TCGPL object).

However, the different forms of the step-wise foreign identification of the involved objects and/or their self and/or relationship attributes can also belong to the method according to the invention, with or without explicit interaction/s of the potential related objects, for example of a service access point (mentioned in the following Sub-section EVI.).

It is preferable for a ranking to be assigned to each attribute for its use in such a related object/task identification, i.e. the above-mentioned real number of its evaluation in a further attribute at a determined point in time. In case a plurality of TCFs can perform a call handling in a TCGP for a SUBC (potentially) related to it (e.g. because there are a plurality of relationship attributes between the respective potentially calling and called SUBC of this TCGP) and thereby involve a respective TCF, the realisation of the relationship attribute with the highest ranking is initially preferably sought for this TCGP and then—if this has not been possible—preferably the realisation of the relationship attribute with the next highest ranking, etc. In all cases the invention provides that apart from an automated—thus possibly anonymously predetermined—selection of the relationship attribute of the considered TCGP becoming effective, the SUBCs related to this relationship attribute can also legitimise/prohibit its selection.

EIII. Repeated Checking (In Terms of Time and Location) of the Attributes of a TCGP:

A related object of a TCGP can learn for this TCGP and the other related objects thereof about all relevant times and locations and correspondingly form its checks and handling by this TCGP corresponding to its requirements, for example it can request, for a connection with a low quality of service to a certain other related object, the provision of a qualitatively better service or its exchange for a "better" routed connection, or it can request the routing of this TCGP via a recording device, or it can demand the real-time translation of the content of the TCGP on the route by means of a sworn interpreter—it can make these demands at any time before or during the coming into being of the TCGP and/or the coming into being of a data transmission therein and/or the coming into being of a certain communication form therein and also at any time thereafter.

Special cases: In a preferred embodiment a SUBC performs the determination whether a considered incoming call (=TCGP) should undergo the call handling provided for it or not, before its final connection—i.e. by a signalling prior to the connection to the called SUBC the call has already been indicated to it, so that it can demand for example that the call should be terminated via another network (for example by VoIP box). It is recalled that a similar call handling, however, can also take place at an earlier time (for example before a signalling of the incoming call to the local exchange of the called subscriber) and also at a location closer to the caller (for example in order to avoid a call initiated in Germany to a Japanese mobile telephone being firstly routed to Japan, when it is already clear that the called is in Germany).

It should be disclosed with effect from here at the latest that it is often easier to state in terms of language and meaning that the objects of a TCGPL make "services" available or provide them to its TCGPs—whereby the term "services" stands for the collective term of the modifications on the TCGPs which related objects thereof can perform on these TCGPs, whereby also the reporting concerning a TCGP is regarded as a modification thereto. A "service" of a TCGPL on one of its TCGPs describes therefore the modifications effected thereon by this service which the considered object can achieve or achieves on it. i.e. can perform or performs for it. It should be noted, however, that this term of "service",—in the same way as the term "service access point" also used below—only simplifies the language use with the TCGPL according to the invention, but does not limit the TCGPL term.

E.IV. Service Selection, TC Network Independence, Service Access Point:

In a preferred embodiment of the invention the objects of the TCGPL are provided in an intermediary TC network used by it (such as defined in the OSI RM, thus e.g. a PSTN/ISDN, Internet, GSM-/UMTS network, satellite network, . . . , on which the target system of a TCGP is ascertained in the course of is initialisation via its L3 address)—e.g. solely by means of its TC network-internal TCGPL server. This intermediary TC network can be "pre-selected" by a SUBC related thereto. A pre-selection by a called SUBC—and that services can be used with such a pre-selection—is described in DE 199 43 742 A1. In the method according to the invention a pre-selection of services can be securely established for a TCGP and/or for a SUBC related to it or be realised for it/by it/to it on a "call by call" basis or at any time during its existence, whereby in the latter cases it makes more sense to speak of a "selection".

Such a pre-selection or selection of services for a TCGP does not require, however, a (TC) network according to OSI-RM at all. Instead, TCGPs can realise, for their technical communication, instead of via an OSI-RM network, also via a single physical medium accessible to all communicating parties together if this is only equipped with a capability—moreover, irrelevant here, To facilitate the communication in these TCGPs and Offer the service access point/s which is/are necessary for the realisation of the pre-selection/selection of services—possibly only for (a) group/s of SUBCs or their devices respectively connected to the service access point/s.

This physical medium and the service access point/s are thus a priori accessible to a considered TCGP and the SUBCs (potentially) related thereto.

Such a service access point can facilitate for a TCGP access to one, to several or to all services of a considered TCGPL. The implementation of a service access point can be "passive"—then, the considered TCGP or SUBC must find it independently in each case—or "active", i.e. the object/s accessible on the service access point constantly scan/s the SUBCs or TCGPs to determine whether they can act on behalf of the latter (and can then be regarded as a kind of "sensor"). What is stated here in relation to service access points applies with adapted meaning of course also to TCGPs which communicate by means of OSI RM networks.

E.V. Secure TCGP Reporting for the Related Objects of a TCGP:

Secure reporting concerning a TCGP possibly requires any-time informing of objects related to it (if desired by them) by authentic, non-falsified information which is as far as possible complete and as far as possible indisputable, not only in relation to the measures required by them for this TCGP and their success/failure but also as far as possible in relation to the measures not required by them for this TCGP—but illegitimately by third parties for it—and their success/failure. The TCGPL should be able to provide certain information of this kind internally to such a related object. The method according to the invention allows in any case in principle the provision at any time for these related objects of such information for their individual notification about such TCGPL internal processes—i.e. also in relation such illegal attacks and/or attack attempts.

E.VI. Flexible Information Filters of a TCGP for Related Objects Thereof:

The method according to the invention allows the related objects thereof at any time to define and implement TCFs to be inserted into information filters, particularly for the identification of:

Information to be filtered and possibly its total or partial destruction or its connection with further information and/or forwarding of such information outside of the TCGP, Of those responsible for its impairment, and For the notification of the objects which is/are related directly or indirectly to a filter in relation to such a filter and its operating mode.

The TCGPL can enable the SUBCs related to a TCGP to be granted differently wide-ranging possibilities to determine the effectiveness of filters defined by them for certain other SUBCs related to this TCGP or for the whole TCGP and/or other TCGPs and their SUBCs. Special filters of this type can be used for protection against any type of undesired information (anti-spam filter, virus filter or other, DOS&DDOS-filter, monopolisation avoidance filter, etc.) and can be provided by the TCGPL or its SUBCs for general use.

E.VII. Attribute-Based Network Management of the TCGPL:

With regard to the efficient assignment of the operating means exclusively for the realisation of the many different communication services of a TCGPL—for example on the basis of future NGNs or neuronal communication systems—the network management thereof is responsible. This can be located in a greatly centralised way (for example on a single server globally responsible for all objects of the TCGPL—then it is generally described as a network management system) but also in a greatly decentralised way (for example on the end systems of the SUBCs of the TCGPL and then also only locally responsible for these). In relation to the available communication services this network management of the TCGPL has achieved a new dimension in complexity both on account of its diversity and variation for the support of the TCGPs in the sense of the SUBCs.

but also and in particular on account of its fundamentally new complexity, due to the completely new SUBC requirements increasing efficiency productivity/comfort/reliability/individualisation capability, and can only be controlled in real time if the method according to the invention of real-time reduction of the decision complexity of the TCGPL management to automatable decisions and the thus automatable real-time control of these decisions is used.

By means of the method according to the invention the TCGPL can fundamentally reduce the decision complexity of its task by limiting the attributes of all its objects to those attributes which can, in an automated way, be recognised by the TCGPL and compiled in their object-individual and securely realisable management functions, whereby these attributes or management functions in the end reflect the interests in the TCGPs of the SUBCs of this TCGPL related to them.

Earlier TC management systems did not take into consideration, alone for the two apparently contradictory reasons of "security" and "real-time capability", the possibilities shown by the method according to the invention—quite apart from the fact that technical communications systems to date were scarcely viewed with regard to the aspect that in them and/or by them the operating means coverage for the most varied TCGPs May only be very brief if this brings considerable advantages, Otherwise may take more time—particularly if they are very cheap.

The consideration of the last two aspects, particularly the possibility of their attributive specification and its automatic immediate implementation possibility can be realised by the method according to the invention in relation to the network management of a TCGPL. To date, these two aspects did not play any role in technical communications.

E.VIII. Attribute-Based Cost Calculation for Operators and SUBCs of the TCGPL:

The usage of the services of a TCGPL by its SUBCs will as a rule not be cost-free. Instead the profits from the SUBCs from the operation of a TCGPL should be greater than those from the operation of TC networks. A TC network provider (e.g. an Internet Service Provider, ISP), which makes accessible to its customers a management service according to the invention for the use of its TC service thus requires from this TCGPL provable so-called "call data records, CDRs" as a reliable basis Both in relation to its SUBCs, for each marketing activity for its TCGPL and for each cost calculation for its use, And also, for itself, for the justification of any bill— frequently with absolutely minimised individual costs for this TCGPL service usage in the "micro payment" range.

It is thus of fundamental importance that in the CDRs— related to a TCGP—of the method according to the invention the attributes of all objects related to this TCGP are also recorded which may be relevant for the billing resulting therefrom. Only such attribute-recording CDRs facilitate the definition of TCGPL services in such a way that they can work in the sense of marketing for comfortable TC network services as their serious "unique selling points" (USPs)—because they also contain the information which facilitate fast-moving and highly targeted marketing campaigns, as are foreseeable within the scope of the future NGN services, for example real-time video conferences with the stars of a film on the occasion of its premiere with simultaneous ordering of its complete content for viewing at the bowling club, etc.

The above short description of the invention in the subsections E.I. to E.VIII.—particularly delimitation resulting therefrom in relation to the state of the art to date of TC technology—shows in particular that and why it leaves far behind it the current "status nascendi" of technology in management of TCGPs, as mentioned at the start with the "blog"—/"push to" services. The method of the invention allows the SUBCs actually and potentially related to the TCGPs in fact a fundamentally new—because much more "pro-active" and hence more "comprehensive" in the comprehensive sense, because much more reliable/secure, much more individualisable and nonetheless much more transparent in quite different respects (particularly in relation to: knowledge, costs, unauthorised access/manipulation attempts, abusive communication attempts, . . . )—management of its TCGPs, in TC networks and in other "communications systems" (the latter understood in the widest sense). To conclude here, we shall recall the introductory comments in relation to new, not yet existing, markets for new communications technologies.

F. DETAILED DESCRIPTION OF SOME EXAMPLES OF THE INVENTION

Figure 2:
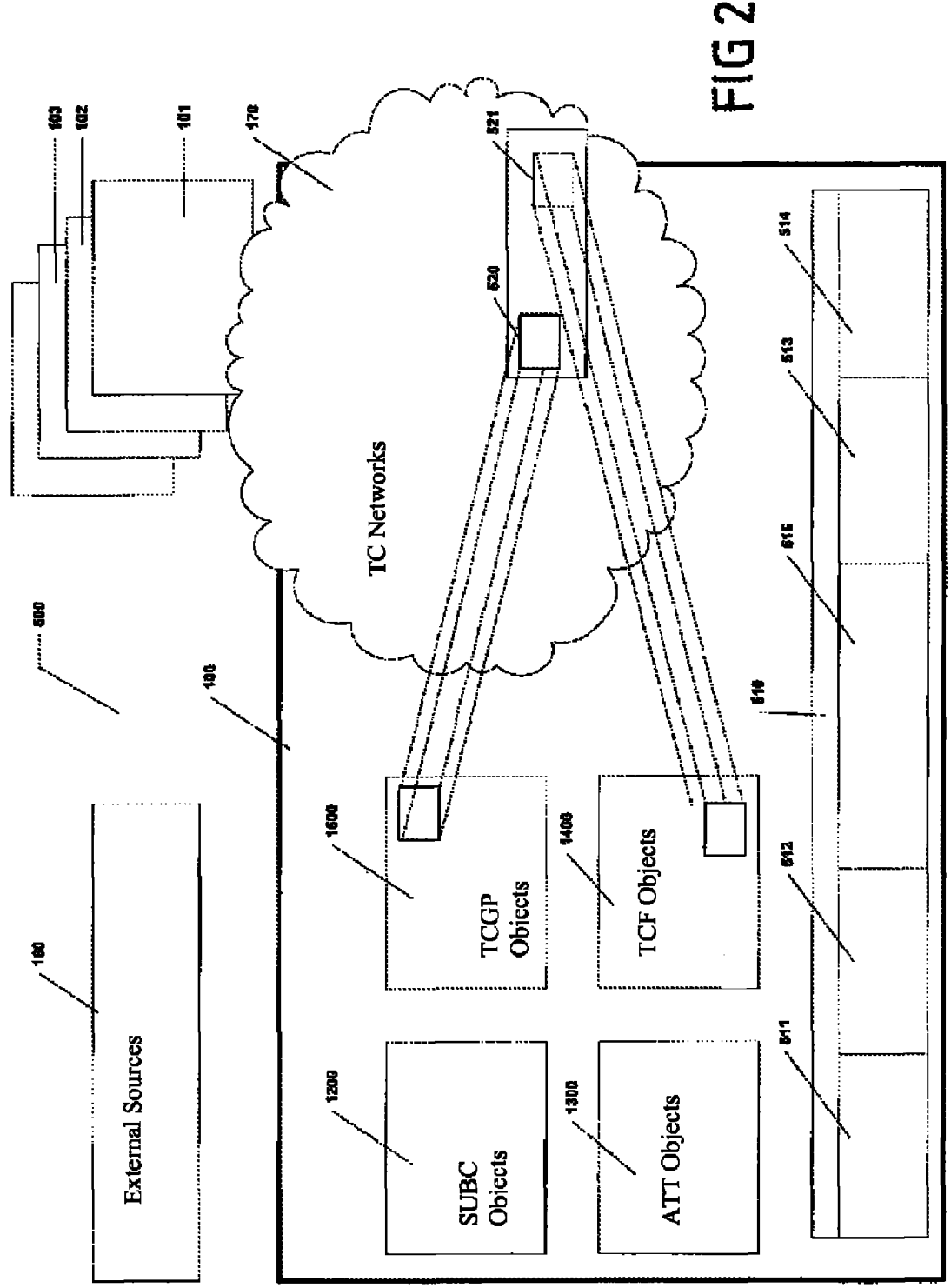
Figure 3:
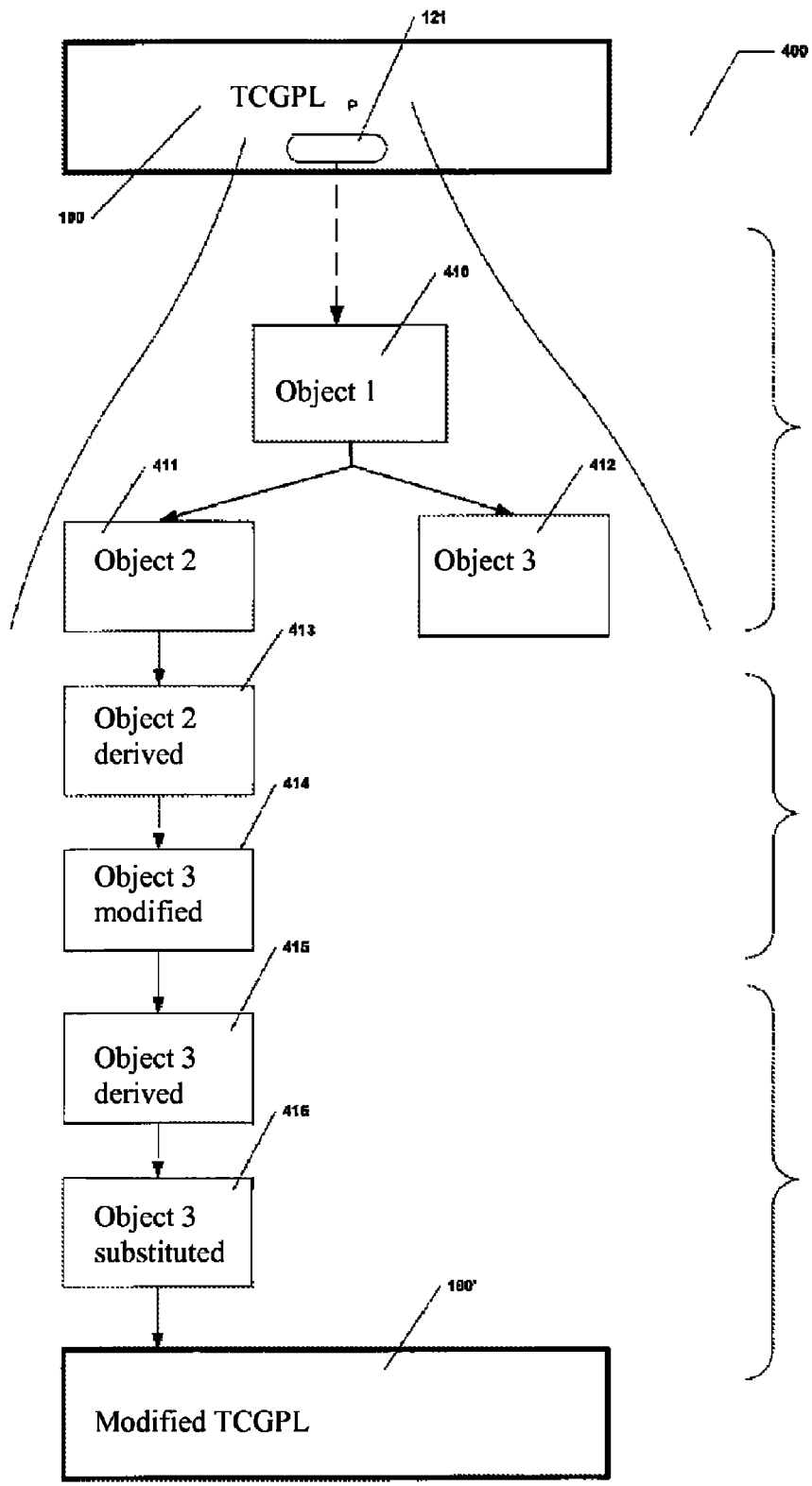
Figure 4:
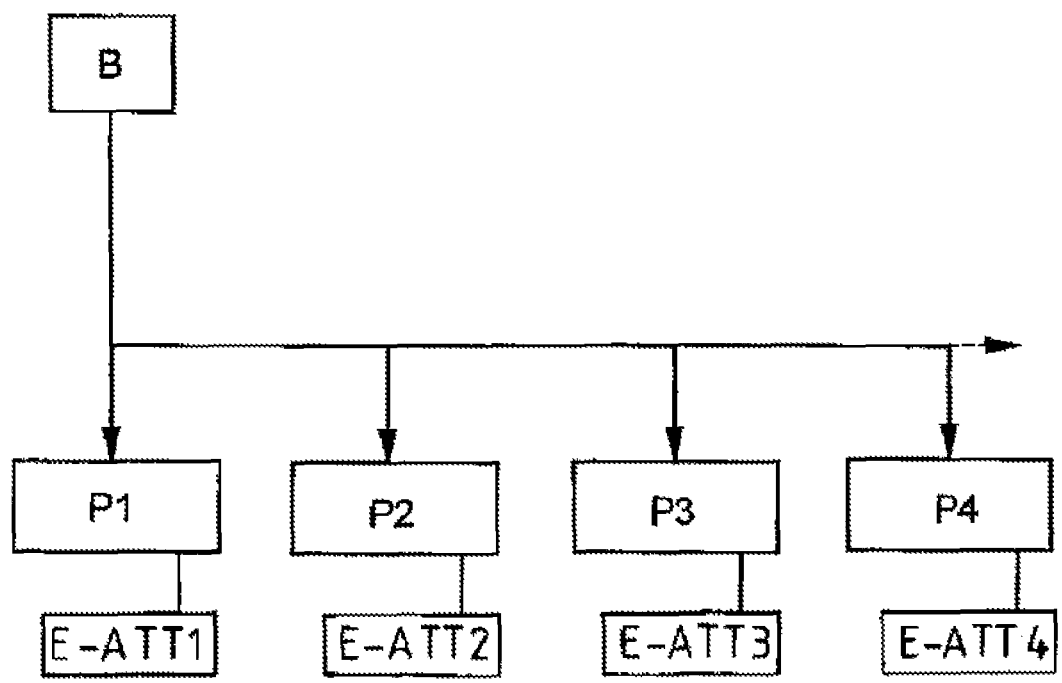
Figure 5:
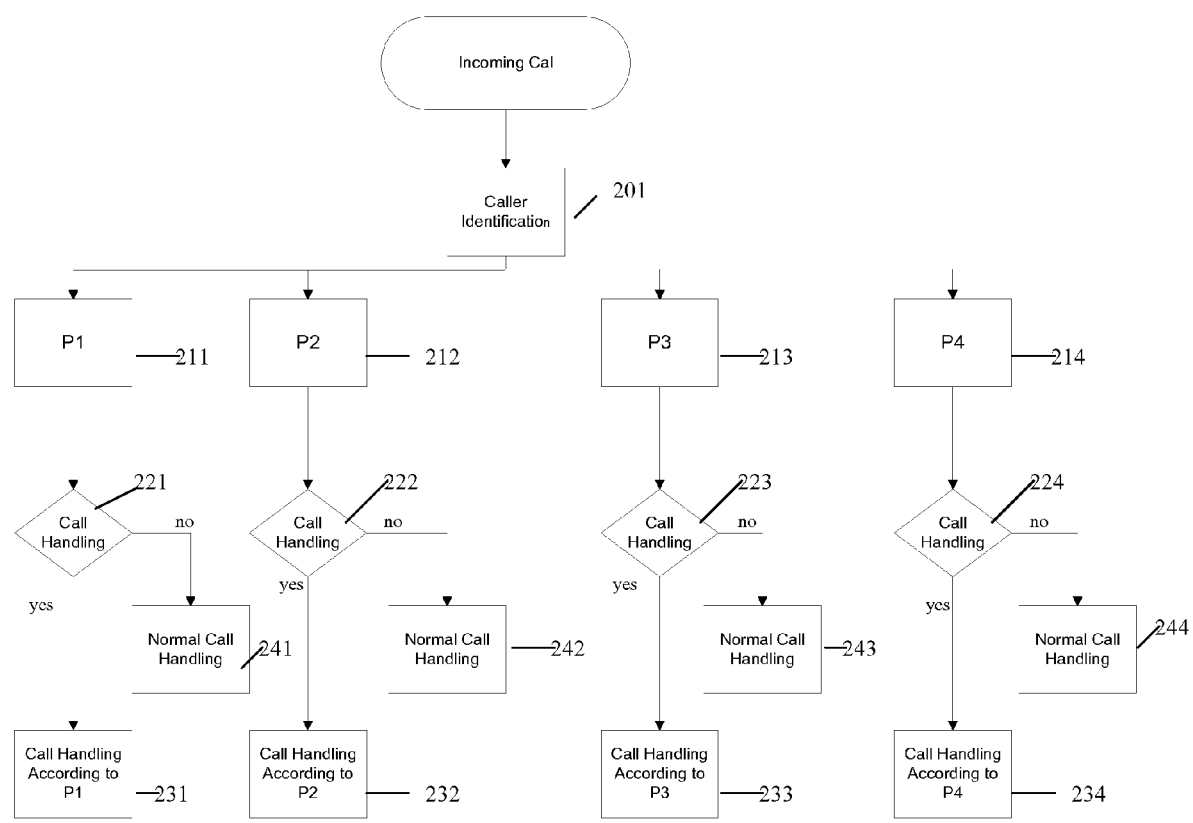
Figure 6:
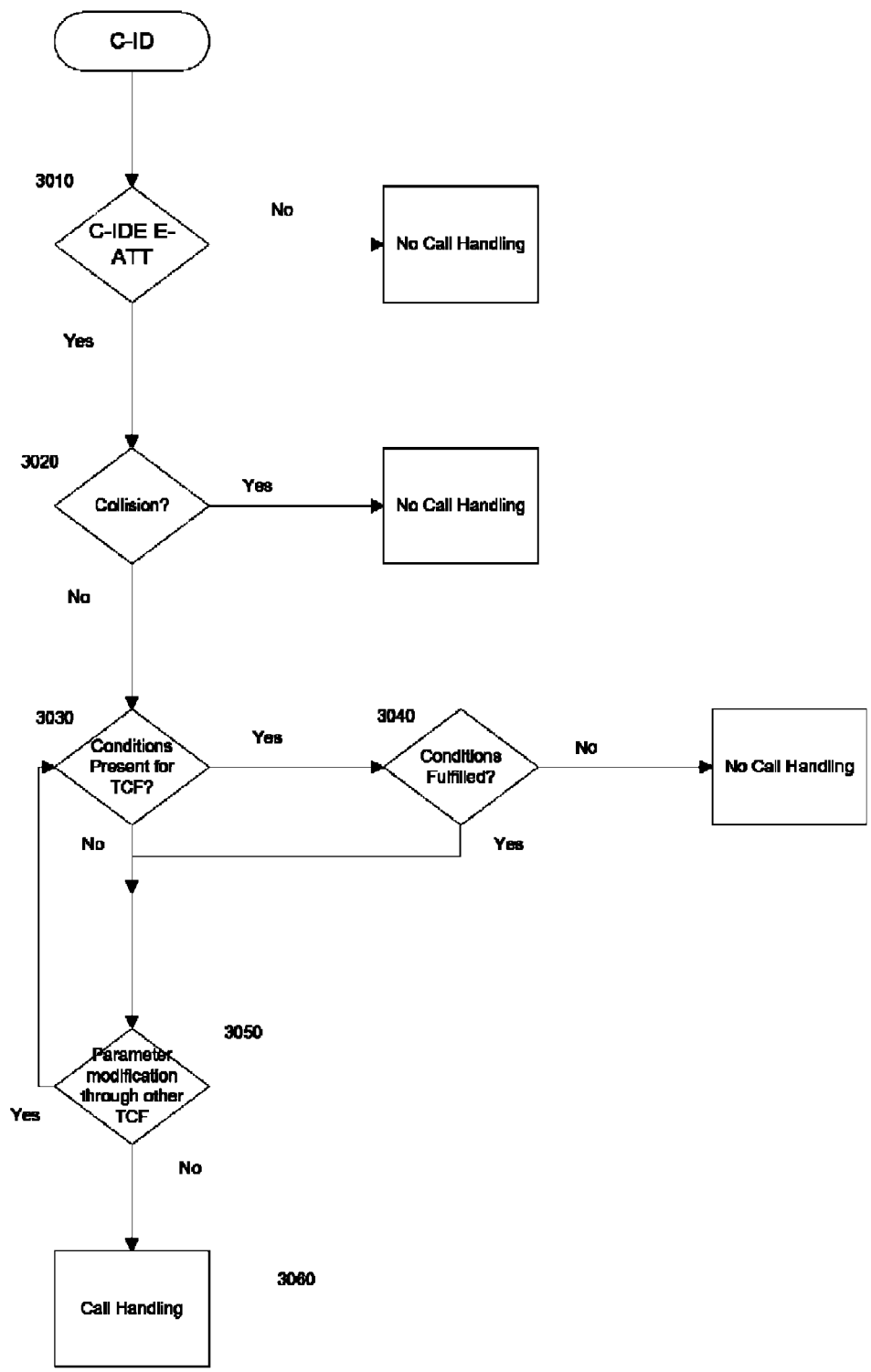
Figure 7:
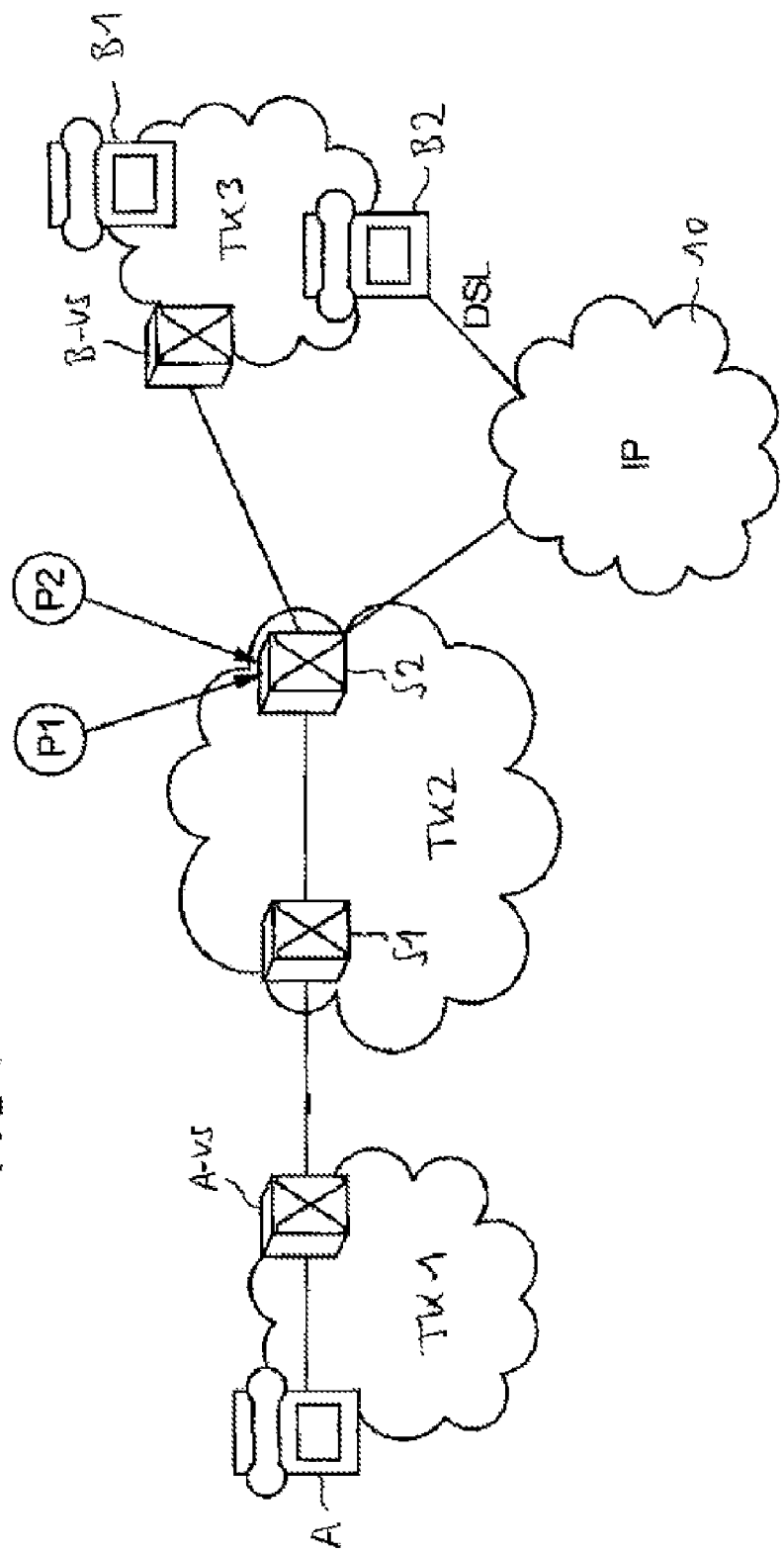

The present invention is clarified in greater detail below with the aid of some examples by reference to the drawings, in which:

FIG. 1 shows an arrangement with a technical communications group platform (TCGPL) and its components;

FIG. 2 schematic relationships of a TCGPL with TC networks and other TCGPLs;

FIG. 3 a schematic representation of an exemplary embodiment of the method according to the invention;

FIG. 4 the storage of identification data in the self-attributes (E-ATTs) of a plurality of TCFs as a reaction to the input by a called SUBC;

FIG. 5 a flow chart relating to the handling of an incoming call (TCGP) by a plurality of TCFs;

FIG. 6 a flow chart relating to the steps which lead to a decision whether a considered TCF performs a call handling of an incoming call (TCGP) or not; and FIG. 7 an exemplary telecommunications arrangement for executing a method for TCGP management, here the handling of calls intended for a called SUBC, whereby for example two TCFs are applied to an incoming call.

FIG. 1 shows an arrangement 300 with a technical communications group platform (TCGPL) 100 which serves for the management of technical communications group processes and provides services for this. A TCGPL is a platform on which the method according to the invention can be executed. A technical communications group process is a technical process, for example a telecommunications process, in which two or more subscribers are involved. The TCGPL 100 is embedded in a real world 301 which comprises real objects, for example end devices 302, 303 which are used by "real" subscribers 110 to 114 of the TCGPL 100, and contains representations of the real objects. The end devices are not necessarily fixedly assigned to a real subscriber, it can for example also be a telephone booth or a telephone in a hotel room which can be used by a subscriber in a time-limited way in order to use the services of the TCGPL. For example the end device 302 is not fixedly assigned to any of the subscribers 110-114 while a fixed assignment to the subscriber 113 exists for the end device 303.

In an embodiment the TCGPL is a system which makes defined services or mechanisms available to a plurality of users. It can be implemented as hardware and/or software. It preferably contains representations of real objects and makes interfaces for communication with these available. The TCGPL facilitates communications processes between a plurality of users by providing the services or mechanisms.

Insofar as a real subscriber 110—144 wishes to use the services of a TCGPL 100 and the management provided by the TCGPL 100, he must register in the TCGPL 100. The TCGPL 100 contains for each subscriber at least one subscriber object (SUBC object) from a group 1200, which may initially be empty, of SUBC objects 120-129 which represent the subscribers in the TCGPL, including their subscriber lines, of the connected end devices and computer and other supporting communications application systems. A plurality of SUBC objects can thereby exist for a real subscriber (e.g. one for his private use, one for his business use, one for his honorary post activities, etc.) For example in FIG. 1 the three SUBC objects 124, 128 and 129 are assigned to the real subscriber 114.

The TCGPL 100 contains and manages, besides the SUBC object group 1200, three further object groups 1300, 1400, 1500. The object group 1300 contains attribute (ATT) objects 130 to 132 which determine for example attributes of other objects. The object group 1400 contains telecommunications function (TCF) objects 140 to 142, the object group 1500 contains technical communications group process (TCGP) objects 150 to 152. Each of these objects can represent one or more real world objects of the corresponding type.

After the execution of the method according to the invention an object of the TCGPL exists in a form executable by the TCGPL. It can hereby be for example an information-carrying data structure such as known for example from the object-orientated programming, or a process.

The TCGPL objects of the object groups 1200, 1300, 1400, 1500 can be generated and modified with the aid of the method according to the invention by real subscribers.

The generation of an executable representation from the modifying object is realised particularly in virtually real-time, i.e. essentially instantaneously (whereby of course a small time interval can elapse until completion of the algorithm), i.e. a subscriber can specify a time for the coming into effect of the modification of the TCGPL which can be in principle any time.

The TCGPL 100 uses for example server 160 or TC networks 170 to 172 from the real world 301. The server 160 can for example be a database, a website server, an FTP server etc. The TC network 170-172 can be for example an ISDN or GSM network or the Internet, together with the respective complete infrastructure and functionality existing in these networks. The TC networks for their part can again use different media 180 to 183 such as radio, optical fibre, copper, space.

FIG. 2 shows an arrangement 500 which comprises a first TCGPL 100 which, like FIG. 1, contains a SUBC object group 1200, an ATT object group 1300, a TCF object group 1400 and a TCGP object group 1500. The TCGPL is based on one or more networks 170, whereby the TCGPL 100 can access the functionalities and the infrastructure of the TC networks 170.

Some of the TCGP or TCF objects of the TCGPL can use parts of the communications processes 520 or functionalities 521 which are made available by the TC networks 170 (this is indicated by the dotted lines which extend from the object groups 1400, 1500 to the TC networks 170). It is pointed out, however, that the TCGPL is not dependent upon using communications processes or functions of a TC network but instead can also facilitate its own TCGPs and offer its own TCFs. As a result the TCGPL 100 can also comprise TCGP objects or TCF objects which are or represent TCGPL-own TCGPs or TCFs which are not provided by the TC network 170.

The arrangement 500 comprises, besides the TCGPL 100, further TCGPLs 101-103 which may be connected via a network or via a plurality of networks of the TC networks 170 to the TCGPL 100, so that an information exchange is possible between the different TCGPLs 100-103. In principle through the use of the TC networks not only connections between several TCGPLs are possible but the communications functions/processes provided by these TC networks are also available.

Outside of the TCGPL 100 there are external sources 160, e.g. servers, on which programs run or measuring devices whose measurement values can be put into electronic form, etc. The external sources 160 can supply e.g. information for the TCGPs which is made available by the TCGPL 100.

In addition the TCGPL 100 has interfaces 510; they can be for example interfaces to an ERP system 512, to a reporting module 513, to a billing system 514, or further interfaces 515. In any case there is at least one user interface 511, via which the users of the TCGPL 100 can use the services of the TCGPL and for example request the provision of a new service by the TCGPL and transmit corresponding specifications for this to the TCGPL. The user interface 511 can for example be a graphic interface or an input facility for DTMF tones via telephone or a speech input facility, etc.

By means of such interfaces the objects of the object groups 1200, 1300, 1400, 1500 of the TCGPL can exchange information with the objects of the real world in order to be able to access the services offered by the objects of the real world.

FIG. 3 shows an example for the modification according to the invention of a technical communications group platform (TCGPL) 100 which is formed for example like the TCGPLs of FIG. 1 or 2 and correspondingly comprises objects of the object groups SUBC, ATT, TCF and TCGP.

The term "provision" is to be understood below as "identify", "modify" or "generate".

In principle the driving, the modifying and the further object can originate respectively from all of the four object groups 1200, 1300, 1400, 1500.

The generation of an executable representation from an object takes place in an automated way as a rule (i.e. without a further interaction of the subscriber with the TCGPL being necessary).

The TCGPL allows in principle any object to be provided in an automated way e.g. in order to realise a new technical communications group process desired by a subscriber. For this, the TCGPL 100 provides a driving object controlled by a subscriber of the TCGPL which defines a further object to be provided by the TCGPL.

A subscriber of the TCGPL 100 desires for example the provision of a new service by the TCGPL (for example a new or a modified telecommunications function (TCF)) or generally a modification of the TCGPL and transmits corresponding specifications to the TCGPL. Conditions can also belong to the definition of the further object, in dependence upon which the further object is generated or executed. On this, the TCGPL provides in a first step (step I) a driving object 410, i.e. identifies an existing object or defines one which is controlled by a subscriber object (SUBC object) 121 assigned to the subscriber.

The driving object 410 defines a further object 412 which is to be modified into the service or modification of the TCGPL desired by the subscriber. Furthermore, in step I the TCGPL provides a modifying object which can perform the desired modifications on the object 412 to be modified.

It is pointed out that of course not only the SUBC object 121 but instead all objects represented (such as e.g. the object 412 to be modified and the modifying object 411) belong to the TCGPL 100. The sequence for the provision of the further object is indeed shown, for reasons of allowing an overview, below the TCGPL 100, but actually takes place within the TCGPL (which is indicated by the lines to the side of the flow chart).

The type of the driving, modifying object and object to be modified can be in principle of any type. For example the modifying object can in this example be an object of the SUBC object group, the ATT, the TCF or the TCGP group.

By the selection or the generation of the modifying object 411 it is simultaneously ensured that the modification on the object 412 to be modified is performed as desired and becomes effective from a fixed time.

In a further step (step II) the TCGPL generates from the modifying object 411 a representation of the object 411 (derived object 413) which can be executed by it. The TCGPL comprises e.g. an interpreter or a compiler which generates from a data structure which is assigned to the modifying object a representation which can be executed under the TCGPL (e.g. formed as software), whereby the executable representation is an algorithm, in particular a procedure.

Finally, the generated (derived) executable object 413 is executed by the TCGPL whereby the object 412 to be modified is modified and therefore the modified object 414 is produced. For example attributes which relate to the object to be modified are hereby modified. The original object to be modified 412 is initially retained.

It is pointed out that the TCGPL management according to the invention includes, besides the modifying of an object already existing in the TCGPL, further possibilities for the provision of the further object, e.g. through generation of a new object.

In a third step (step III) an executable representation 415 is generated from the modified object 414 by the TCGPL 100 which can be executed under the TCGPL (similarly to the modifying object 413). The object to be modified is substituted by the executable representation 415.

The sequence of the substitution of the object to be modified by the modified object and the generation of the executable representation from the modified object can be principally any and depends for example upon the implementation of the respective TCGPL. However, the generation of the executable representation and the substitution must have taken place at the latest by a time defined by the driving object, since with effect from then the modification should be effective/available.

By the provision of the modified object the TCGPL 100 has been modified and transformed into a new TCGPL 100'. However, as mentioned, the invention is not restricted, for the provision of the further object, to modifying an existing object, but can for example also generate a new object for this. In this case a TCGPL extended in relation to the original TCGPL would be generated. A modification of the TCGPL is carried out in any case by one of its objects.

In the exemplary embodiment of FIG. 3 only a single modifying object or object to be modified is indeed selected but this could certainly be more than one.

It is further pointed out that "at least one" is meant with the description "one" (e.g. object), in such a way that not only one but instead a plurality of further objects to be provided can be defined by the driving object.

A special embodiment of the method according to the invention and telecommunications functions (TCF) realised therein will be described with the aid of FIGS. 4 to 7.

FIG. 4 shows in an abstract representation four TCFs P1, P2, P3, P4, which each undertake a defined call handling of an incoming call. The number of TCFs can thereby be any number. For example the TCFs are respectively independently acting processes. Such independently acting processes can in particular be formed so that they do not comprise global variables common to a plurality of processes but instead only local variables. The TCFs are for example implemented as software which is executed on one more processors.

Furthermore self-attributes E-ATT1, E-ATT2, E-ATT3, E-ATT4 with identification data are assigned to each TCF. These self-attributes serve for the checking of the "relatedness" or the connectability of the TCGPs with SUBCs and TCFs, which should, upon performing a call to a certain called SUBC B, undergo a determined call handling corresponding to the respective TCF P1, P2, P3, P4.

The self-attributes E-ATT1, E-ATT2, E-ATT3, E-ATT4 thereby contain for example certain calling numbers as identification data. For each incoming call for SUBC B it is checked by the TCFs whether the calling number of the calling SUBC, SUBC A, corresponds to one of the calling numbers stored in the respective self-attribute E-ATT1, E-ATT2, E-ATT3, E-ATT4 of the TCFs P1, P2, P3, P4. For this case, the corresponding TCF P1, P2, P3, P4 is applied to this TCGP (the incoming call).

In another example, instead of or as a complement to certain calling numbers, the self-attributes contain certain names. In order to ascertain whether a certain TCF is to be applied to a TCGP (incoming call) or not, the TCF requests, for example within the scope of an interactive input request from the calling subscriber, to enter his name (for example coded via DTMF).

The person skilled in the art recognises that there are multiple possibilities for identifying SUBCs or also SUBC groups through identification data and ascertaining in case of a TCGP (incoming call) whether the calling SUBC is contained in the number of stored SUBCs or identification data.

The self-attributes E-ATT1, E-ATT2, E-ATT3, E-ATT4 can be realised in the manner desired. For example, the self-attributes are realised as storage (for example software storage or hardware storage devices) or contained in such storage. If this exemplary embodiment provides for TCFs realised as independently acting processes, storage can be assigned to each of the processes, said storage device containing process-specific data. Insofar as a hardware storage device is used it can be provided for example through a defined storage area of a RAM storage element of a processor. However, it is thereby important that the storage area is only available to the considered TCGP (and—insofar as this is allowed—to the further objects related to this TCGP) and only these objects can access the considered self-attribute.

FIG. 4 shows for the four TCFs shown the determination of the self-attributes, here the storage of identification data in reaction to the input by a called SUBC B. The SUBC B advises—for example using a graphic user interface—each of the TCFs P1, P2, P3, P4 which called SUBCs should undergo a call handling corresponding to the respective TCF P1, P2, P3, P4. The self-attributes E-ATT1, E-ATT2, E-ATT3, E-ATT4 store these specific identification data For example the called SUBC B advises the TCF P1 of a number of telephone numbers. If an incoming call comprises as sender information (calling party number) a calling number which corresponds to one of these calling numbers the incoming call undergoes a call handling corresponding to TCF P1.

For each of the TCFs, SUBCs can be indicated by the called B SUBC and stored. It can thereby naturally also be provided that certain calling SUBCs are stored in the self-attributes E-ATT1, E-ATT2, E-ATT3, E-ATT4 of a plurality of TCFs. How, in such a case, potentially arising conflicts are dealt with in the call handling is described below with the aid of FIG. 6.

FIG. 5 shows a flow chart for handling an incoming call. An incoming call undergoes in a first stage 201 a caller identification. Signalling information of the incoming call is evaluated for example for caller identification. For example the integrated services digital network ISDN provides for transmission of the telephone number of the calling SUBC, the so-called calling party number, with the call signalling. It is therefore only necessary to evaluate the corresponding signalling protocol element.

The caller identification can, however, also take place in a different way. For example it can be provided that the calling SUBC is requested to give his name or other data identifying him (by DTMF or by computer). Further types of caller identification are described in EP 0 837 611 A2, to which reference is expressly made in this respect.

The caller identification 201 leads to the identification of the calling SUBC in relation to at least one of its parameters, for example by detecting the calling number of the calling SUBC. The result of the caller identification is described below as the C-ID (C-ID=Calling Party ID).

The caller identification can also lead to the result that an incoming call originates from a SUBC who belongs to a group of persons who have a certain quality. The quality is for example membership of own family and this quality is represented by a code, which the calling SUBC advises upon request or together with the calling number dialled. The code is recognised in the caller identification 201 and the SUBC (caller) is thereby identified in relation to his membership of a certain group. In the E-ATTs of the TCF the code is naturally stored so that it can be compared with an input code.

In steps 211, 212, 213, 214 each incoming call is fed to the existing TCFs P1, P2, P3, P4 for call handling. Each TCF thereby monitors the incoming calls and checks whether it is to be applied to these calls.

It is pointed out that the caller identification does not have to take place centrally, for example through a service switching point of a certain telecommunications network, but instead can also be carried out separately by each of the TCFs P1, P2, P3, P4.

The check whether a call handling is to be carried out corresponding to the respective TCF takes place in the checking stage 221, 222, 223, 224 for each TCF. This checking takes place with the aid of the evaluation of the attributes. Insofar as the verification leads to a call handling having to be performed, such call handling takes place according to the respective TCF P1, P2, P3, P4 in the steps 231, 232, 233, 234. Insofar as the verification leads to no call handling having to be performed corresponding to the respective TCF, a normal call handling takes place, i.e. the call is connected without a special call handling as standard to the called B SUBC, steps 241, 242, 243, 244.

FIG. 6 shows the exact sequences in the decision whether a call handling is performed, corresponding to the steps 221, 222, 223, 224 of FIG. 5.

It is checked in a next step 3010 whether an identity C-ID resulting in the caller identification exists in the considered TCF. It is checked in step 3010 whether the determined caller identity is contained in the quantity of identification data of the self-attributes E-ATT1, E-ATT2, E-ATT3, E-ATT4 of the considered TCF. If this is not the case, no call handling takes place corresponding to the considered TCF.

If the C-ID is an element of the identification data which are stored for the considered TCF in its self-attribute, a check takes place in the next step 3020 regarding whether a collision with a TCF of higher priority is present. As mentioned, all existing TCFs monitor a new, incoming call and check their applicability to the call in question. It is possible that a plurality or also all of the existing TCFs are to be applied to an incoming call.

The case can thereby arise that a TCF can no longer be meaningfully executed if an incoming call has already been handled corresponding to another TCF. For example it does not make sense to perform the TCF "answering facility" if, on account of a previous TCF "call forwarding", the call could already be routed and terminated at another end device or subscriber line. In another example it is not possible to execute the TCF "answering facility " if previously the TCF "media conversion" from voice into fax has been performed. It is therefore provided that a different ranking is assigned to the individual TCFs and for the case of a plurality of TCFs being applicable to an incoming call, the TCF of the highest ranking is executed first, then the TCF of the next lowest ranking, etc.

If it is ascertained in step 3020 that a collision with a higher-ranking TCF is present, no call handling takes place. Otherwise, it is checked in a further step 3030 whether certain conditions exist for the execution of the TCF.

If for example a considered TCF provides as call handling for the termination of a call via the Internet plus DSL connection or WLAN, such a TCF can only be successfully executed if the called B SUBC has a DSL connection or a WLAN connection and an IP address is currently assigned to it.

The service or the TCF "media conversion from voice into fax" is only possible, as a further example, if the called B SUBC has a fax device or a fax card.

It is thus checked in step 3030 whether such conditions exist. If this is the case it is checked in step 3040 whether the corresponding conditions are fulfilled, thus for example the B SUBC is connected to a DSL connection and an IP address is assigned to it. If the conditions are not fulfilled, no call handling takes place corresponding to the TCF in question.

If the conditions are fulfilled, it is checked in step 3050 whether possibly existing parameters have changed on account of preceding higher-ranking TCFs. If for example a higher-ranking TCF performed a call forwarding, the calling number of the called subscriber has changed. The TCF must in this case go back to step 3030 and check whether certain conditions are still present for the successful execution of the TCF in spite of the parameter change.

Insofar as no further changes are to be considered (in any case after renewed performance of steps 3030 and 3040), the call handling then takes place in step 3060 corresponding to the considered TCF.

The flow chart of FIG. 6 is carried out for each of the existing TCFs. Furthermore, the flowchart is performed for each incoming call.

FIG. 7 shows for example a telecommunications arrangement for the implementation of the described method with two exemplary TCFs which are applied to an existing incoming call.

A calling A-SUBC is located in a first TC network TC 1 and is connected there to a local exchange A-LX. The network TC1 is the subscriber network of the A-SUBC. For example it is the fixed network of the one-time monopolist, Deutsche Telekom AG.

The A-SUBC wishes to carry out a telephone call to a SUBC B1 in a further subscriber network TC3. The network TC3 is usually identical to the network TC1 although this must not necessarily be the case. The B1 SUBC is connected to its local exchange B-LX.

The connection between the A-SUBC and the B1 SUBC does not take place directly via the TC network TC1, TC3, but instead via a pre-selected telecommunications network TC2 of a connection network operator connected between them. This intermediately connected telecommunications network TC2 provides the called SUBC B1 (and possibly also the calling SUBC A, which is not, however, the matter in question) with additional services. The services are for example call waiting, answering facility, call forwarding, media conversion, network conversion etc. Such services are known to the person skilled in the art so that they will not be mentioned in detail at this point.

Two of such services are represented for example schematically in FIGS. 7 as T1 and T2.

An incoming call is routed by the local exchange A-LX of the network TC1 to a first switch S1 of the network TC2 and routed by this to the switch S2 of the network TC2. Without a call handling by the TCF P1 and/or P2, the incoming call would be routed via the local exchange B-LX in the known way to the B1 SUBC, whereby a signalling would take place between the switch S2 and the local exchange B-LX.

The B1 SUBC has advised the TCFs P1, P2 corresponding to FIG. 4 which calling SUBCs should undergo the corresponding TCF or the corresponding service.

The TCF P1 should in the exemplary embodiment shown realise a call forwarding. The TCF P2 should provide a call termination via IP-switching network and DSL connection, i.e. an incoming call is routed to an IP-switching network 10, particularly the Internet and routed by this via a DSL line to a certain subscriber line. Such VoIP call terminations are known in themselves and take place for example using a so-called SIP protocol. No further details will be given concerning the precise sequence at this point.

The case will now be observed that the called B1 SUBC has established a call forwarding to another B2 SUBC, i.e. incoming calls are routed to another subscriber line. The B2 SUBC should also be located in the network TC3 in the considered example, but this is not necessary.

The TCF P1 for call forwarding detects the incoming call and checks whether the calling SUBC is stored in "its" self-attributes and should accordingly undergo a call forwarding., and to which new calling number this should take place. It is hereby assumed that the A-SUBC is contained in the self-attributes of the TCF P1 so that the call is forwarded to the B2 SUBC. Furthermore, the TCF P2 also checks whether the calling SUBC is contained in "its" self-attributes. This should also be the case in the example considered. The TCF P1 waits before it undertakes a call handling of the incoming call for the execution of TCF P2 as this has higher ranking. .

After the availability of the new calling number at which the call should be terminated the TCF P2 realises a call termination via the IP switching network 10 and the DSL connection. This leads to the data being routed into the IP switching network 10 and from this via a DSL connection to the B2-SUBC. A box can for example thereby be assigned to the B2-SUBC which converts the IP data of the VoIP termination again into normal voice data. Alternatively the B2 SUBC or its telephone itself is IP-capable.

It is important for the present invention that each of the existing TCFs P1, P2 directly accesses an incoming call and checks whether the call should undergo a call handling corresponding to its own TCF.

The access to the incoming call can thereby take place in principle at different times, whereby this time can be dependent upon (the respective service or) the respective TCF. A first time of the access is a time at which no call signalling has taken place yet between the switch S2 and the local exchange B-LX. A second time is a time at which a call signalling has already taken place between the switch S2 and the local exchange B-LX but the call has not yet been terminated (connected through). The TCF thereby quasi takes over the call before its termination. The termination can thereby be delayed by a certain period of for example a second.

In a third variant, a TCF accesses an incoming call after a termination has already taken place at B1 subscriber. It can thereby be provided that the completed termination is again given up within the scope of the call handling.

It is pointed out that preferred services are those wherein a called SUBC who at the time of the arrival of an incoming call is already on the telephone with a third subscriber or who is on the Internet, is provided with an additional service for call handling. Such additional services are described in DE 199 43 742 A1, to which reference is expressly made in this respect.

Special applications of the TCGPL according to the invention are discussed below as a complement to the drawings.
F1. E-Learning TCGPL System A TCGPL formed as an E-learning management system (LMS) is provided which facilitates a particularly flexible electronic learning. The LMS-TCGPL offers to its students ("S1" to "Sn" of the TCGPL) participation in various courses, for example on the subject of HTML (TCGP, "HTM" to TCGP "marketing" of the TCGPL). Each course is supervised by tutors (represented by SUBC objects "T1" TO "In").

Before the start of the first course of a student "Sn", the necessary objects for "registration" of the student are generated by the LMS operator (represented by SUBC object "B"). For this, the preconditions (has the student paid, is his application approved, are his abilities sufficient) are checked. The following are generated in this example:
  at least one SUBC object, e.g. SUBC "Sn",
  at least one attribute object formed as a self-attribute object for identification of the student (which, besides ObjectID and ObjectTypeID also contains name, e-mail address, start date and the registration number),
  at least one attribute object formed as a relationship attribute object for connectability to the respective course (e.g. TCGP "HTML").

In order to successfully pass a course, each student must download homework for a number of course chapters from the LMS-TCGPL (TCF "ftp_download_HA") and upload the solution to the LMS-TCGPL (TCF "ftp_upload_HA"). Beforehand, however, the student must correctly answer a comprehension test in the form of a multiple choice set of questions VT relating to the respective course chapter (TCF "check_web_formular_VT") in order to obtain the entitlement (attribute object in the form of a self-attribute "access entitlement homework") for downloading the homework.

After successful completion of all homework for the course, the student obtains an access entitlement to the pass certificate or certificate of attendance, PP (self-attribute, "access entitlement PP_HTML", relationship attribute(s) between the objects "SUBC Sx", "TCGP HTML" "TCF ftp_upload_PP_HTML", "TCF check_web_formular_VT_HTML").

The management according to the invention of the TCGPs of the LMS-TCGPL allows the students, in principle, to direct any requests to the LMS TCGPL, for example:
a) A student S1 wishes, with effect from the next homework, to have his answers checked for correctness before uploading (by means of the TCF "ftp_upload_HA") by a checking program (e.g. tidy, validator.W3.org) and makes a corresponding request to the LMS-TCGPL.
  The LMS-TCGPL hereby provides, in a first step, a driving object (object 1) in the form of the subscriber object SUBC S1 (thus identifies it in this example), which defines a further object (object 3) for the requested checking of the answers.
  The LMS-TCGPL identifies or defines, furthermore, a modifying object (object 2) in the form of an operation attribute object (called "Creator" here). This modifying object (object 3) is in a position to provide the object to be modified (object 3), as defined by the driving object SUBC S1 (object 1). In the present example the object to be modified (object 3) does not yet even exist at this time but must be generated by object 2.
  The modifying object "Creator" (object 2) is transformed by the LMS-TCGPL in a second step into a form which is executable for it and executed. By the execution, the modified object (object 3) is produced in the form of a new operation ATT object "HTML Conformance Check".
  The modified object "HTML Conformance Check", object 3, is automatically converted into a representation which can be executed by the. LMS, so that it is available upon downloading of the next homework by SUBC S1.
  Driving Object (object 1): SUBC "S1"
  Modifying object (object 2): operation ATT ("Creator")
  Modified object (object 3): operation ATT ("HTML Conformance Check"), report-ATT HA
  Time: upon downloading the next homework by SUBC S1 b) A tutor T1 generates a TCF "VNC" in order to be able to discuss the source code together with his students.
Driving object (object 1): SUBC "T1"
Modifying object (object 2): operation ATT ("Creator")
Modified object (object 3): TCF "VNC" (newly generated)
Time: immediately
c) A SUBC S3 brings its private equipment and a video conferencing possibility (e.g. Messenger) into the TCGP in order to achieve visual contact and greater trust with the tutor T2.
Driving object (object 1): SUBC "S3"
Modifying object (object 2): operation ATT ("extend chat to video conference")
Modified object (object 3): TCGP between "S3" and "T2"
Time: specified by SUBC S3, e.g. date, time.
d) A SUBC S4 generates a TCF which allows TCFs for reading the teaching material, the uploads and downloads of homework and the realisation of the VTs on his mobile telephone.
Driving object (object 1): SUBC "S4"
Modifying object (object 2): operation ATT (combines the ICFs for reading the teaching material, the uploads and downloads of homework and the realisation of the VTs with the TCF "mobile telephone inclusion")
Modified object (object 3): TCF "Mobile telephone inclusion"
Time: immediately
e) Tutor T3 generates a TCF which signals all incoming homework/student enquiries on his mobile telephone.
Driving object (object 1): SUBC "T3"
Modifying object (object 2): TCF "ftp_upload_HA" or TCF "Enquiry"
Modified object (object 3): TCF "Mobile telephone inclusion"
Time: with the next incoming homework or enquiry F2. Example "Hospital"-CGPL A TCGPL is formed as a management system within a hospital ("Hospital" TCGPL), whereby patients who are represented by SUBC objects (SUBC "P1", . . . , "Pn") of the TCGPL, undergo certain treatments (TCGP "B1", . . . , "Bn") and can use certain services (TCGP "D1", . . . "Dn". The treatments are carried out by staff members of the hospital (SUBC objects "M1", . . . , "Mn").

Of course, there are a number of safety and authentication algorithms in this TCGPL, which are, however, not to be examined further here.

If a patient comes into the hospital, either the (already existing) SUBC object "Pn" assigned to him is continued or a new one is supplied for him. For each "Pn" reports concerning all treatments are generated (report ATT objects).

The management of the hospital TCGPL allows for example the following:
a) A doctor M1 has generated a relationship ATT that he will only carry out an operation (TCGP "operation") when either sister Mx or sister My are involved in the operation.
Driving object (object 1): SUBC: "M1"
Modifying object (object 2): SUBC "head of personnel assignment"
Modified object (object 3): TCGP "operation" (extended by the relationship ATT that Mx or My must always be connected)
Time: at the next team planning
In a first step the objects SUBC M1, SUBC "head of personnel assignment" and the TCGP "operation" are identified as the 3 objects which are required for the desired modification of the TCGPL; as a modifying object, the SUBC object "head of operations" is required, as SUBC "M1" does not have the authority to modify the TCGP "operation".
In a second step the object 2 (modifying object) is derived by the TCGPL in an automated way and object 2 carries out the modification to object 3. The third step must be carried out in this case before the next team planning, as the desired modification should already be available for the next team planning. I.e. the TCGP "operation" is extended by the object "head of operations" by the relationship ATT. Subsequently, the modified object (TCGP "operation", extended by the relationship ATT) is derived by the TCGPL and the "old" object "operation" is substituted by the object extended by the relationship ATT.
b) For the admission (=TCGP "admission") of a private patient it is set as an operation ATT that, via his health insurance, reports concerning treatments by other doctors are requested. (In this connection the TCGPL of the health insurance must have TCGPs which identify the corresponding doctors and can call up reports from them.)
Driving object (object 1): TCGP "admission"
Modifying object (object 2): operation ATT (with evaluation of the self-ATT "private patient")
Modified object (object 3): report ATT of a private patient
Time: upon implementation of the hospital-TCGPL
c) For patients under 10 years the hospital provides a TCGP D1 which transmits audio and video data of the patient (live) and can be received by as many persons as authorised by the guardians. In addition these persons can transmit audio and video data to the patient. It may be simultaneous data (conversations) or also recordings (book, game).
Driving object (object 1): SUBC "hospital management"
Modifying object (object 2): SUBC "hospital"
Modified object (object 3): TCGP "D1" (newly generated)
Time: immediately
d) If a member of staff must reach a certain location within the hospital under time pressure he can modify the TCGP D2 which, instead of the normal route, guides him along the currently quickest route (e.g. in consideration of stops in the lift, obstacles in passages, . . . ).
Driving object (object 1): SUBC staff member under time pressure
Modifying object (object 2): operation ATT
Modified object (object 3): TCGP "D2" (connected with the staff member)
Time: successful authentication of the staff member
e) An ambulance service can call up the TCGP D3 from the hospital TCGPL, with the aid of which it can transmit first examination results as reports of the SUBC object belonging to the patient "P3" and pre-order staff, equipment and rooms, so that they are already available upon his arrival at the hospital and thus a part of the TCGP "admission" is already done. (Furthermore, the TGCP leads it on the quickest route over the hospital property to the appropriate wing of the hospital).
Driving object (object 1): SUBC "M2" (ambulance service)
Modifying object (object 2): TCGP "D3"
Modified object (object 3): TCGP "admission P3"
Time: after transmission of the data and request of the staff
f) If in the case of a certain treatment B1 at least one staff member cannot be present, the hospital TCGPL makes TCGPs available, via which the staff member can perform his treatment remotely.
Driving object (object 1): SUBC "hospital"
Modifying object (object 2): operation ATT (add "remote treatment possibility")
Modified object (object 3): TCGP treatment "B1"
Time: when the TCGPL ascertains that a staff member needed for the treatment is not on site g) With every request for staff members or equipment (both with requests just generated and also requests already existing shortly before occurence), an operation ATT of the hospital TCGPL is evaluated, which checks whether the maximum deployment time has been exceeded by this deployment. If this were the case, the operation ATT would suggest a substitute; if this is not accepted, the request can only be fulfilled if released by predetermined persons.
Driving object (object 1) SUBC "hospital"
Modifying object (object 2): operation ATT
Modified object (object 3): TCF "deployment of staff/equipment"
Time: exceeding of maximum deployment time of related staff/equipment F3. Example "Bank" TCGPL A TCGPL (bank TCGPL) is formed as a banking management system. In a bank, transactions (=TCGP "V1", . . . , "Vn") are carried out between accounts (SUBC objects "K1", . . . , "Kn") of the bank TCGPL and the accounts are administered by bank employees (=SUBC objects "M1", . . . , "Mn"). The accounts belong to account holders (=SUBC objects "I1", . . . "In").

In this TCGPL there are of course a number of security and authentication algorithms which are not, however, explained here explicitly.

Only a bank employee can open or close an account; but this is only on the instruction of the respective account holder. Many of the Vns are only possible if the account holder agrees, whereby he can generally agree to a class of Vns (e.g. monthly transfer of the rent) or individual Vns (e.g. purchase of shares). Furthermore, there are Vns which do not have an agreement obligation (e.g. payment of interest).

For each change which is triggered by an account holder the bank has CDRs ("Call data records") written via report ATTS in order to be able to charge the (real) account holders for this use of the services of the bank TCGPL.

The management of the bank TCGPL according to the invention facilitates for example:

a) An account holder has defined the following operation ATT: if an amount is requested via his credit card, he would like to receive a message immediately on his mobile telephone in relation to the amount of and the reason for the request. If he answers this message within an hour with a previously defined PIN, the debit may not be realised.
Driving object (object 1): TCF "debit request by credit card"
Modifying object (object 2): operation ATT
Modified object (object 3): TCF "message to mobile telephone" (newly generated)
Time: next week when the credit card has been activated
In a first step the objects TCF "debit request by credit card" and the newly generated operation ATT are identified. The TCF "message to mobile telephone" is defined. In a second step the object 2 (the operation ATT) is derived and the new TOE generated. In a third step the new TCF is automatically derived by the TCGPL and is then available with effect from activation of the credit card.

b) For each account there is a self-ATT which describes the available credit range. The employee Mk has modified a relationship ATT of the TCGPL "purchase of shares" for all accounts which he administrates in such a way that a purchase of shares is only possible if the credit range of the account is not thereby exceeded.
Driving object (object 1): operation ATT, "perform TCF "newly determine account balance""
Modifying object (object 2): "newly determine account balance"
Modified object (object 3): TCGP "purchase of shares"(no shares are purchased)
Time: if falling below the credit range of an account c) An account holder would like to be secure and defines on his account K1 an operation ATT that only such sums may be debited from his account, in which the debit TCGP contains a PIN which he has defined himself.
Driving object (object 1): SUBC account "K1"
Modifying object (object 2): operation ATT
Modified object (object 3): debit TCGP (is combined with a PIN request)
Time: upon next request for debit d) For another account holder, a firewall is defined for his account K3, in which it is determined which TCGPs may debit/credit his account (e.g. debiting only to accounts Kx, Ky, Kz and also only if the debit request has been submitted via the network operator/payment provider xyz) and which amounts may be transferred to these accounts as a maximum per month.
Driving object (object 1): TCGP "debit"
Modifying object (object 2): operation ATT
Modified object: object 3: TCF "calculate account balance" (dependent upon the result of the firewall check)
Time: upon activation of online banking for the account e) An account holder has set up 3 access codes for cash withdrawals from his account K5, for each access code he has set a different level of the monthly allowance (operation ATT), so that his daughter may not withdraw more than her monthly pocket money from the account and the living costs do not exceed a certain amount per month.
Driving object (object 1): SUBC "K5"
Modifying object (object 2): operation ATT
Modified object (object 3): TCGP "cash withdrawal"
Time: upon connection of a TCGP "cash withdrawal" with "K5"

f) An account holder modifies the default report ATTs of his account K6. He would like to have an account extract on his mobile telephone if money is to be debited from the same account K2 for the second time within a week.
Driving object (object 1): SUBC "K6"
Modifying object (object 2): TCGP debit by "K7"
Modified object (object 3): TCGP "account extract" (is connected to "K6"))
Time: immediately g) The holder 11 of the share account K8 has defined a TCF which monitors 3 different stock markets and monitors the stock exchange price for one of his shares. Furthermore, he has provided a TCGP "share purchase" with an operation ATT that all parts of this share are to be sold as soon as the rates at all three monitored stock markets have increased beyond a certain value.
Driving object (object 1): SUBC share account "K8" (constantly uses the TCF)
Modifying object (object 2): operation ATT
Modified object (object 3): TCGP "sale of shares" (is connected to "K8")
Time: as soon as the specified value of the share is exceeded F4. Example Sport & Play TCGPL A TCGPL is formed as a sport & play portal.
Players (=SUBC "S1", "Sn") can conclude sporting bets (=TCGP "W1", . . . "Wn") at betting offices (=SUBC "B1", . . . , "Bn"),
Players (=SUBC "C1", . . . , "Cn") can participate in online group games (=TCGP "G1", . . . , "Gn") or
in sporting events (TCGP)="E1", . . . , "En") online A player Sn may only take part in a bet Wm if he is creditworthy according to Schufa, has agreed to the collection from a valid credit card, is not on a black list at the credit card institute and has not so far caused any charge backs. A stake is only deemed to be placed if the amount can be reserved via the credit card.

In order to take part in an online group game a player needs different properties for each type of game; for each game, he can ask for a new SUBC object Cn with a base set of self-ATTs or continue to use a Cj which he has already used in a previous game. The modification of the self-ATTs of such Cx's is subject to certain rules: upon new instantiation of a Cx the player may freely set the values of the self-ATTs required for this game but their total value may not exceed a certain sum adapted to the respective level of the game. Afterwards, his self-ATTs are only modified by the events in the game. Such a Cx can also be controlled by a group of players who either make arrangements between themselves or use a software which manages the "action right".

With online games in which several groups participate, the TCGPL provides for each group a TCGP, via which the respective group members can exchange amongst themselves, depending upon the availability of the end devices of the group members (if for example a member does not have an audio output device available—or is deaf—the TCGPL converts language simultaneously into writing and converts, on the other hand, written statements of this participant back into audio data for the others). The TCGPs of the groups for a game cannot be connected in such a way that each group can be sure that the other groups are not involved in their information exchange.

Each SUBC who takes part in a sporting event E1 can define via operation ATTs for E1 when he wants to be "served" by which camera(s) and which microphone(s) and can request various types of commentaries.

Only players who have paid in a minimum stake can take part in games which require a minimum credit. The winning game TCGPs can access this ATT of the players and modify it in dependence upon the result of the game.

The following is possible with the modification according to the invention of communications group processes (management) of the sport+game TCGP, for example:

a) The players S1, S2, S3 would like to conclude a betting association, i.e. as soon as one of the three participates in a bet, all 3 players are to take part. As the credit worthiness of a betting association is more difficult to check for the betting offices, the modification of the TCGP "conclude bet" may only be undertaken by an associate of the platform operator who uses the SUBC object "platform operator" for this.
Driving object (object 1): SUBC "S1"
Modifying object (object 2): SUBC "platform operator"
Modified object (object 3): TCGP "conclude bet" (is connected, instead of to one player, to the 3 players S1, S2, S3)
Time: immediately
In step I the 3 objects required are identified: driving object SUBC "S1", modifying object SUBC "platform operator", object to be modified the TCGP "conclude bet". In step II the SUBC "platform operator" is derived in an automated way by the TCGPL and the modification is performed by the SUBC "platform operator" on the TCGP "conclude bet". In step III the "old" TCGP "conclude bet" is substituted by the modified one and immediately derived in an automated way by the TCGPL.
b) A betting office B1 would like to make a profit of at least 50% and only accepts a new instruction (operation ATT, the new instruction can only be associated under said circumstances) for the bet W1 if the at least 50% would be realised with this additional instruction.
Driving object (object 1): SUBC "B1"
Modifying object (object 2): operation ATT
Modified object (object 3): TCGP "bet W1" is extended by a player
Time: at the start of the bet W1
c) For a simulated marathon run on home running tracks player C1 would like to motivate himself and defines a TCF which indicates to him all co-runners on a simulated street and causes his own representation to flash.
Driving object (object 1): SUBC "C1"
Modifying object (object 2): TCF (newly generated)
Modified object (object 3): TCGP "simulated marathon run"
Time: immediately
d) The operator of a fantasy game G1 defines operation ATTs for certain scenes in the game which take these scenes out of the flow of the game if at least one of the players now participating does not fulfil a certain feature in his profile stored in the platform upon registration (e.g. age, sex, credit, . . . ).
Driving object (object 1): SUBC "operator"
Modifying object (object 2): players whose profile contains an excluding feature Modified object (object 3): TCGP "G1"
Time: at the next start of "G1"
e) A SUBC C3 of sporting events has defined a TCF so that for each sporting event he is connected to other "like-minded" SUBCs and virtually takes part in the event together with them.
Driving object (object 1): SUBC "C3"
Modifying object (object 2): operation ATT which searches for "like-minded" SUBCs
Modified object (object 3): TCF which connects the "like-minded" (newly generated)
Time: before the next football game

G. LIST OF ABBREVIATIONS

TCGPL Technical communications group platform
TCGP Technical communications group process
ATT Attribute
SUBC Subscriber object
TCF Telecommunications function
A attributable

The invention claimed is:

1. A method for real-time modification of a technical communications group process (TCGP) encapsulated and managed by a technical communications group platform (TCGPL), said TCGP having a plurality of subscribers, said TCGPL using at least one telecommunications network, wherein a TCGP is controlled by at least one distributed object that is executable by the TCGPL, the method comprising:
   (a) receiving at said TCGPL a driving object defined by a subscriber, which driving object defines a modification which is to be executed on at least one distributed object of the TCGP subscribed to by said subscriber, wherein said modification modifies said TCGP in accordance with said subscriber's security, privacy, and information needs, as specified by the driving object;
   (b) deriving an executable modifying object from said driving object;
   (c) executing in said TCGPL the modifying object to obtain at least one modified distributed object; and (d) substituting in said TCGPL the at least one modified distributed object for said at least one distributed object;

such that said TCGPL carries out said TCGP as modified by said modified distributed object.

2. A method according to claim 1, further comprising, as part of said subscriber's security needs, assessing by the TCGPL the authenticity and integrity of all information within the TCGPL that is generated:
  i) for defining said TCGP,
  ii) when establishing or managing said TCGP by the TCGPL,
  iii) when legitimately using said TCGP by a subscriber, and
  iv) when illegitimately attempting to use said TCGP by a non-subscriber.

3. A method according to claim 2, wherein assessment by said TCGPL of information authenticity and integrity is performed in accordance with TCGPL provided security levels, as selected or defined by said subscriber.

4. A method according to claim 1, further comprising, as part of said subscriber's privacy needs, assessing by the TCGPL the anonymity and unreadability by non-subscribing and/or unauthorized entities of the TCGP of all information within the TCGPL that is generated
  i) for defining said TCGP,
  ii) when establishing or managing said TCGP by the TCGPL,
  iii) when legitimately using said TCGP by a subscriber, and
  iv) when illegitimately attempting to use said TCGP by a non-subscriber.

5. A method according to claim 4, wherein assessment by said TCGPL of information anonymity and unreadability is performed in accordance with TCGPL provided privacy levels, as selected or defined by said subscriber.

6. A method according to claim 1, further comprising, as part of said subscriber's information needs, assessing by the TCGPL the availability to said subscriber of all information within the TCGPL that is generated
  i) for defining the TCGP,
  ii) when establishing or managing said TCGP by the TCGPL,
  iii) when legitimately using said TCGP by a subscriber, and
  iv) when illegitimately attempting to use said TCGP by a non-subscriber.

7. A method according to claim 6, wherein assessment by said TCGPL of information availability is performed in accordance with TCGPL provided monitoring and documenting levels, as selected or defined by said subscriber.

8. Apparatus for real-time modification of a technical communications group process (TCGP) encapsulated and managed by a technical communications group platform (TCGPL), said TCGP having a plurality of subscribers, said TCGPL using at least one telecommunications network, wherein a TCGP is controlled by at least one distributed object that is executable by the TCGPL, the apparatus comprising:
  a processor; and
  a non-transitory storage medium containing processor-executable instructions for:
  (a) receiving at said TCGPL a driving object defined by a subscriber, which driving object defines a modification which is to be executed on at least one distributed object of the TCGP subscribed to by said subscriber, wherein said modification modifies said TCGP in accordance with said subscriber's security, privacy, and information needs, as specified by the driving object;
  (b) deriving an executable modifying object from said driving object;
  (c) executing in said TCGPL the modifying object to obtain at least one modified distributed object; and
  (d) substituting in said TCGPL the at least one modified distributed object for said at least one distributed object;

such that said TCGPL carries out said TCGP as modified by said modified distributed object.

9. Apparatus according to claim 8, further comprising, as part of said subscriber's security needs, processor-executable instructions for assessing by the TCGPL the authenticity and integrity of all information within the TCGPL that is generated:
  i) for defining said TCGP,
  ii) when establishing or managing said TCGP by the TCGPL,
  iii) when legitimately using said TCGP by a subscriber, and
  iv) when illegitimately attempting to use said TCGP by a non-subscriber.

10. Apparatus according to claim 9, wherein assessment by said TCGPL of information authenticity and integrity is performed in accordance with TCGPL provided security levels, as selected or defined by said subscriber.

11. Apparatus according to claim 8, further comprising, as part of said subscriber's privacy needs, processor-executable instructions for assessing by the TCGPL the anonymity and unreadability by non-subscribing and/or unauthorized entities of the TCGP of all information within the TCGPL that is generated
  i) for defining said TCGP,
  ii) when establishing or managing said TCGP by the TCGPL,
  iii) when legitimately using said TCGP by a subscriber, and
  iv) when illegitimately attempting to use said TCGP by a non-subscriber.

12. Apparatus according to claim 11, wherein assessment by said TCGPL of information anonymity and unreadability is performed in accordance with TCGPL provided privacy levels, as selected or defined by said subscriber.

13. Apparatus according to claim 8, further comprising, as part of said subscriber's information needs, processor-executable instructions for assessing by the TCGPL the availability to said subscriber of all information within the TCGPL that is generated
  i) for defining the TCGP,
  ii) when establishing or managing said TCGP by the TCGPL,
  iii) when legitimately using said TCGP by a subscriber, and
  iv) when illegitimately attempting to use said TCGP by a non-subscriber.

14. Apparatus according to claim 13, wherein assessment by said TCGPL of information availability is performed in accordance with TCGPL provided monitoring and documenting levels, as selected or defined by said subscriber.

* * * * *